US008914795B2

(12) United States Patent
Osogami et al.

(10) Patent No.: US 8,914,795 B2
(45) Date of Patent: Dec. 16, 2014

(54) DETERMINING AN ALLOCATION CONFIGURATION FOR ALLOCATING VIRTUAL MACHINES TO PHYSICAL MACHINES

(75) Inventors: Takayuki Osogami, Kanagawa-ken (JP); Raymond H. Rudy, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/359,825

(22) Filed: Jan. 27, 2012

(65) Prior Publication Data

US 2012/0198447 A1 Aug. 2, 2012

(30) Foreign Application Priority Data

Jan. 31, 2011 (JP) .................. 2011-017876

(51) Int. Cl.
- *G06F 9/455* (2006.01)
- *G06F 9/46* (2006.01)
- *G06F 15/173* (2006.01)
- *G06F 9/50* (2006.01)

(52) U.S. Cl.
CPC .... *G06F 9/45558* (2013.01); *G06F 2209/5019* (2013.01); *G06F 9/5077* (2013.01); *G06F 2009/4557* (2013.01); *G06F 9/5066* (2013.01)
USPC .............. 718/1; 718/102; 718/104; 718/105; 709/226

(58) Field of Classification Search
None
See application file for complete search history.

(56) References Cited

U.S. PATENT DOCUMENTS

| 2003/0177176 A1* | 9/2003 | Hirschfeld et al. ........... 709/203 |
| 2008/0189468 A1* | 8/2008 | Schmidt et al. .................. 711/6 |
| 2011/0145616 A1* | 6/2011 | Rychlik et al. ................ 713/323 |
| 2011/0307291 A1* | 12/2011 | Rolia et al. ................... 705/7.25 |

FOREIGN PATENT DOCUMENTS

| JP | 2005148875 | 6/2005 |
| JP | 2007200347 | 8/2007 |
| JP | 2010237736 | 10/2010 |

* cited by examiner

*Primary Examiner* — Lewis A Bullock, Jr.
*Assistant Examiner* — Melissa Alfred
(74) *Attorney, Agent, or Firm* — Tutunjian & Bitetto, P.C.; Jeff Tang

(57) ABSTRACT

An information processing apparatus having a prediction section that determines the predicted peak usage amount of physical resources for each time interval for individual clusters each including a plurality of virtual machines having the same function; a setting section sets a constraint that ensures that, for individual combinations of a first physical machine, a second physical machine, and a time interval, the total predicted peak usage amount of a physical resource predicted for the first physical machine if the second physical machine stops during the time interval does not exceed a physical resource amount prepared for the first physical machine; and an allocation-configuration deriving section derives an allocation configuration by calculating, in accordance with the constraint, a solution to an optimization problem for minimizing, as an objective function, the sum total of the physical resource amounts of all of physical machines to which the virtual machines are allocated.

10 Claims, 13 Drawing Sheets

$$\text{minimize: } \sum_{k \in K} z_k \qquad \text{...(35)}$$

FIG.12 subject to:

$$x_{b,c,i,k,\ell} \in \{0,1\}, \forall b \in B, \forall c \in C_{AS}(b), \forall i \in \{\text{Active, Standby}\}, \forall k, \ell \in K : k \neq \ell \qquad \text{...(36)}$$

$$y_{b,c,k,\ell} \in \{0,1\}, \forall b \in B, \forall c \in C_{AA}(b), \forall k, \ell \in K : k \neq \ell \qquad \text{...(37)}$$

$$v_{b,c,k,k'} \in \{0,1\}, \forall b \in B, \forall c \in C_{AS}(b), \forall k, k' \in K : k \neq k' \qquad \text{...(38)}$$

$$w_{b,c,k,k'} \in \{0,1\}, \forall b \in B, \forall c \in C_{AA}(b), \forall k, k' \in K : k < k' \qquad \text{...(39)}$$

$$z_k \in [0, U], \forall k \in K \qquad \text{...(40)}$$

$$\sum_{\ell \in K} x_{b,c,\text{Active},k,\ell} + \sum_{\ell \in K} x_{b,c,\text{Standby},k,\ell} \leq 1, \forall b \in B, \forall c \in C_{AS}(b), \forall k \in K \qquad \text{...(41)}$$

$$\sum_{k,\ell \in K: \ell \neq k} x_{b,c,i,k,\ell} = 1, \forall b \in B, \forall c \in C_{AS}(b), \forall i \in \{\text{Active, Standby}\} \qquad \text{...(42)}$$

$$v_{b,c,k,k'} + 1 \geq \sum_{\ell \in K} x_{b,c,\text{Active},k,\ell} + \sum_{\ell \in K} x_{b,c,\text{Standby},k',\ell}, \quad \forall b \in B, \forall c \in C_{AS}(b), \forall k, k' \in K : k \neq k' \qquad \text{...(43)}$$

$$\sum_{\ell \in K} y_{b,c,k,\ell} \leq 1, \forall b \in B, \forall c \in C_{AA}(b), \forall k \in K \qquad \text{...(44)}$$

$$\sum_{k,\ell \in K: \ell \neq k} y_{b,c,k,\ell} = q_{b,c}, \forall b \in B, \forall c \in C_{AA}(b) \qquad \text{...(45)}$$

$$w_{b,c,k,k'} + 1 \geq \sum_{\ell \in K} y_{b,c,k,\ell} + \sum_{\ell \in K} y_{b,c,k',\ell}, \forall b \in B, \forall c \in C_{AA}(b), \forall k, k' \in K : k < k' \qquad \text{...(46)}$$

$$\left\lfloor \frac{|C_{AS}(b)| + \sum_{c \in C_{AA}(b)} q_{b,c}}{|K|} \right\rfloor \leq \sum_{c \in C_{AS}(b)} \sum_{\ell \in K} x_{b,c,\text{Active},k,\ell} + \sum_{c \in C_{AA}(b)} \sum_{\ell \in K} y_{b,c,k,\ell} \leq \left\lceil \frac{|C_{AS}(b)| + \sum_{c \in C_{AA}(b)} q_{b,c}}{|K|} \right\rceil, \forall b \in B, \forall k \in K \qquad \text{...(47)}$$

$$\sum_{b \in B} \sum_{c \in C_{AS}(b)} \left( (a_{b,c,t} - s_{b,c,t}) v_{b,c,k',k} + a_{b,c,t} \sum_{\ell \in K} x_{b,c,\text{Active},k,\ell} + s_{b,c,t} \sum_{\ell \in K} x_{b,c,\text{Standby},k,\ell} \right)$$
$$+ \sum_{b \in B} \sum_{c \in C_{AA}(b)} \left( \frac{p_{b,c,t}}{q_{b,c}} \sum_{\ell \in K} y_{b,c,k,\ell} + \left( \frac{p_{b,c,t}}{q_{b,c}-1} - \frac{p_{b,c,t}}{q_{b,c}} \right) w_{j,k,k'} \right) \leq z_k, \forall t \in T, \forall k, k' \in K : k < k' \qquad \text{...(48)}$$

$$\sum_{b \in B} \sum_{c \in C_{AS}(b)} \left( (a_{b,c,t} - s_{b,c,t}) v_{b,c,k',k} + a_{b,c,t} \sum_{\ell \in K} x_{b,c,\text{Active},k,\ell} + s_{b,c,t} \sum_{\ell \in K} x_{b,c,\text{Standby},k,\ell} \right)$$
$$+ \sum_{b \in B} \sum_{c \in C_{AA}(b)} \left( \frac{p_{b,c,t}}{q_{b,c}} \sum_{\ell \in K} y_{b,c,k,\ell} + \left( \frac{p_{b,c,t}}{q_{b,c}-1} - \frac{p_{b,c,t}}{q_{b,c}} \right) w_{j,k',k} \right) \leq z_k, \forall t \in T, \forall k, k' \in K : k' < k \qquad \text{...(49)}$$

$$\sum_{b \in B} \sum_{c \in C_{AS}(b)} \left( a_{b,c,t} \left( x_{b,c,\text{Active},k',k} + \sum_{\ell \in K} x_{b,c,\text{Active},k,\ell} \right) + s_{b,c,t} \left( x_{b,c,\text{Standby},k',k} + \sum_{\ell \in K} x_{b,c,\text{Standby},k,\ell} \right) \right)$$
$$+ \sum_{b \in B} \sum_{c \in C_{AA}(b)} \frac{p_{b,c,t}}{q_{b,c}} \left( y_{b,c,k',k} + \sum_{\ell \in K} y_{b,c,k,\ell} \right) \leq z_k, \forall t \in T, \forall k, k' \in K : k \neq k' \qquad \text{...(50)}$$

DETERMINING AN ALLOCATION CONFIGURATION FOR ALLOCATING VIRTUAL MACHINES TO PHYSICAL MACHINES

CROSS-REFERENCE TO RELATED APPLICATION

This application claims priority under 35 U.S.C. §119 from Japanese Patent Application No. 2011-017876 filed Jan. 31, 2011, the entire contents of which are incorporated herein by reference.

BACKGROUND OF THE INVENTION

1. Field of the Invention

The present invention relates an optimization technique for an information processing system, and more specifically, to an information processing apparatus, an information processing system, and an allocation-configuration determination method for deriving an optimal allocation configuration for allocating one or more virtual machines to one or more physical machines, a program, and a recording medium.

2. Description of Related Art

As system virtualization technology has developed in recent years, a server consolidation base that uses virtualization technology has been constructed in organizations equipped with large-scale information processing systems, such as financial institutions and large enterprises, for the purpose of efficiently utilizing their own IT resources to reduce the total cost of ownership (TCO). The server consolidation aims to reduce the number of physical resources as a whole by improving the resource use efficiency by integrating the server function of a plurality of operating systems, which are operated in a plurality of physical servers, to a smaller number of high-performance physical machines.

A known technique in the related art for improving the resource use efficiency manages allocation of physical resources to virtual machines. For example, a technique called micro-partitioning permits the throughput of physical processors to be allocated to virtual machines in units of fine grain. Japanese Unexamined Patent Application Publication No. 2007-200347 discloses a technique for automatically dynamically changes the allocation of computer resources to individual logical sections in accordance with some information on workloads processed on OSs in the individual logical sections and the loads of the OSs.

Japanese Unexamined Patent Application Publication No. 2005-148875 discloses a method for automatic allocation for changing the allocation of computer resources among logical sections during the running of OSs. Furthermore, in relation to management of virtual machine allocation for the purpose of improving the resource use efficiency, Japanese Unexamined Patent Application Publication No. 2010-237736 discloses an operation management system capable of setting the upper limit of virtual machines to be allocated to a specific agent machine in consideration of the importance of the agent machine and stability of the system.

SUMMARY OF THE INVENTION

One aspect of the present invention provides an information processing apparatus configured to determine an allocation configuration for allocating virtual machines to physical machines, the apparatus including: a prediction section configured to determine a predicted peak usage amount of physical resources for each time interval for individual clusters where the clusters include a plurality of virtual machines; a setting section configured to set a constraint that ensures that, for individual combinations of a first physical machine, a second physical machine, and a time interval, the total predicted peak usage amount of the physical resource predicted for the first physical machine if the second physical machine stops during the time interval does not exceed a physical resource amount prepared for the first physical machine; and an allocation-configuration deriving section configured to derive an allocation configuration by calculating, in accordance with the constraint, a solution to an optimization problem for minimizing, as an objective function, the sum total of the physical resource amounts of the plurality of physical machines to which the virtual machines are allocated.

Another aspect of the present invention provides an information processing system having a plurality of physical machines that each provide a virtual-machine operating environment and an information processing apparatus that allocates virtual machines to the plurality of physical machines, the information processing apparatus including: a prediction section configured to determine a predicted peak usage amount of physical resources for each time interval for individual clusters where the clusters include a plurality of virtual machines; a setting section configured to set a constraint that ensures that, for individual combinations of a first physical machine, a second physical machine, and a time interval, the total predicted peak usage amount of the physical resource predicted for the first physical machine if the second physical machine stops during the time interval does not exceed a physical resource amount prepared for the first physical machine; an allocation-configuration deriving section configured to derive an allocation configuration by calculating, in accordance with the constraint, a solution to an optimization problem for minimizing, as an objective function, the sum total of the physical resource amounts of the plurality of physical machines to which the virtual machines are allocated; and an allocation processing section configured to allocate the virtual machines on the physical machine, of the plurality of physical machines, determined according to the allocation configuration.

Another aspect of the present invention provides a computer-executable method for determining an allocation configuration for allocating virtual machines to physical machines, the method including the steps of: determining a predicted peak usage amount of physical resources for each time interval for individual clusters where the clusters include a plurality of virtual machines; setting a constraint that ensures that, for individual combinations of a first physical machine, a second physical machine, and a time interval, the total predicted peak usage amount of the physical resource predicted for the first physical machine if the second physical machine stops during the time interval does not exceed the physical resource amount prepared for the first physical machine; and deriving an allocation configuration by calculating, in accordance with the constraint, a solution to an optimization problem for minimizing, as an objective function, the sum total of the physical resource amounts of the plurality of physical machines to which the virtual machines are allocated.

Another aspect of the present invention provides a computer readable article of manufacture tangibly embodying non-transitory computer readable instructions which, when executed, cause a computer to carry out the steps of a method for determining an allocation configuration for allocating virtual machines to physical machines, the method including the steps of: determining a predicted peak usage amount of physical resources for each time interval for individual clusters where the clusters include a plurality of virtual machines; setting a constraint that ensures that, for individual combinations of a first physical machine, a second physical machine, and a time interval, the total predicted peak usage amount of the physical resource predicted for the first physical machine if the second physical machine stops during the time interval does not exceed the physical resource amount prepared for the first physical machine; and deriving an allocation configuration by calculating, in accordance with the constraint, a solution to an optimization problem for minimizing, as an objective function, the sum total of the physical resource amounts of the plurality of physical machines to which the virtual machines are allocated.

BRIEF DESCRIPTION OF THE DRAWINGS

In order to describe features and benefits of the embodiment of the invention in detail, the following drawings will be referred to. Where possible, same or similar reference number will be used in drawings and description to denote same or similar part, in which:

FIG. 12 is a diagram showing expressions expressing an optimization problem according to a fourth embodiment.

DETAILED DESCRIPTION OF THE PREFERRED EMBODIMENTS

Figure 1:
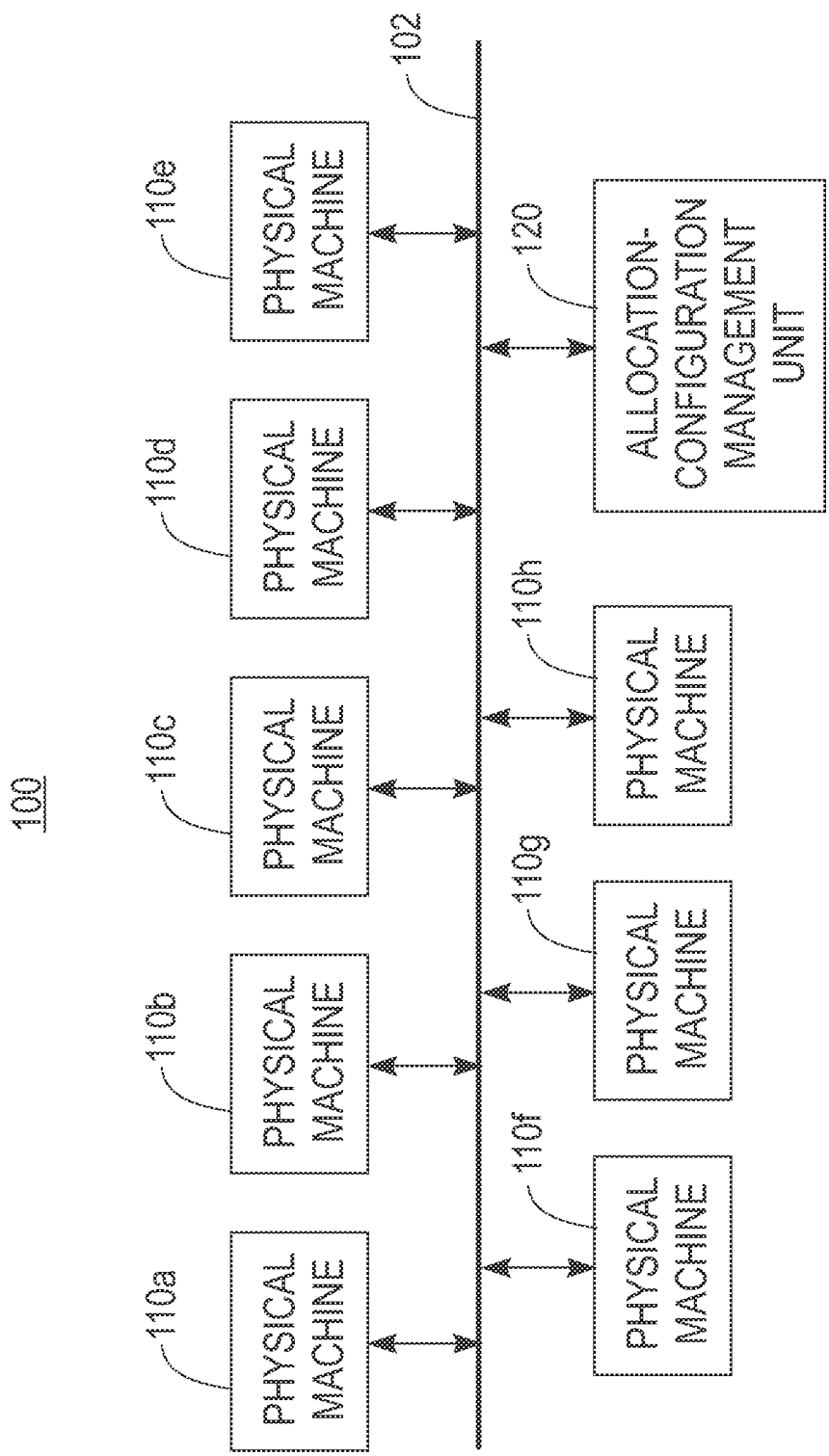
FIG. 1 is a schematic diagram of a virtualization system according to a first embodiment of the present invention.

The present invention will be described hereinafter on the basis of embodiments; however, the present invention is not limited to the embodiments described below. The following embodiments will be described using a virtualization system including a plurality of physical machines that individually provide virtual-machine operating environments and an allocation-configuration managing unit that allocates virtual machines to the plurality of physical machines by way of example.

In the server consolidation base described above, it is desirable to appropriately program the allocation configuration of virtual machines in consideration of resource use efficiency. However, in the present circumstances, the programming of the allocation configuration of virtual machines and estimation of the number of necessary physical resources prepared in the system have been performed manually using spreadsheet software or the like. Accordingly, in the case where existing operating systems are expanded step by step on a server consolidation base, estimation of the amount of physical resources must be performed manually every time a new operating system is added, which is troublesome. Furthermore, the manual estimation does not provide sufficient estimation accuracy, which can cause an excess amount of physical resources, thus being insufficient in terms of use efficiency.

The present invention has been made in consideration of the insufficiency of the related art. Accordingly, an object of the present invention is to provide an information processing apparatus, an information processing system, and a method for determining an allocation configuration for deriving the allocation configuration of virtual machines that allows a minimum necessary amount of physical resources to be provided so that services can be continuously provided in consideration of the load characteristics of the individual server functions even if part of the physical machines stops due to a fault or maintenance, as well as a program and a recording medium for the same.

Solution to Problem

To achieve the above object, the present invention provides an information processing apparatus having the following characteristics and an information processing system including the information processing apparatus. To perform an operation for determining the allocation configuration, the information processing apparatus of the present invention determines the predicted peak usage amount of physical resources for each time interval for individual clusters each including a plurality of virtual machines having the same function. The information processing apparatus of the present invention sets an optimization problem including an objective function and constraints using the predicted peak usage amount.

The optimization problem includes a constraint that ensures that, for individual combinations of a first physical machine, a second physical machine, and a time interval, the total predicted peak usage amount of a physical resource predicted for the first physical machine if the second physical machine stops during the time interval does not exceed a physical resource amount prepared for the first physical machine. The optimization problem further includes, as an objective function, the total physical resource amount of all the plurality of physical machines to which the virtual machines are allocated. The information processing apparatus derives an allocation configuration by calculating, in accordance with the constraint, a solution to an optimization problem for minimizing, as an objective function, the total physical resource amounts of all of a plurality of physical machines.

Furthermore, the information processing apparatus of the present invention can, for the first physical machine k, the second physical machine k', and the time interval t, for which the total predicted peak usage amount is predicted, formulate the total predicted peak usage amount $\phi_{k,k',t}$ as the sum total of the predicted peak usage amount $\gamma_{c,t}$ of entire clusters c, predicted for the first physical machine k if the second physical machine k' stops, the peak usage amount $\gamma_{c,t}$ being given in correspondence with a decision variable that defines the allocation configuration of the clusters c. The clusters can include a cluster that shares processes for server functions in terms of time, such as an active-standby configuration, and a cluster that shares processes for server functions in terms of volume, such as an active-active configuration. Furthermore, the optimization problem can preferably be expressed as a 0-1 integer linear programming problem including a decision variable that can take a value "0" or "1" that defines the allocation configuration of virtual machines.

Furthermore, the information processing apparatus of the present invention can calculate an optimal solution to a decision variable of the optimization problem by iterating a process of searching for an optimal solution to a decision variable that defines the allocation configuration of a target virtual machine in each cluster c by switching between target virtual machines while fixing a decision variable that defines the allocation configuration of a virtual machine other than the target virtual machine. Furthermore, according to the present invention, a method for a computer system corresponding to the information processing apparatus to determine an allocation configuration for allocating virtual machines to physical machines, a computer-executable program for implementing the information processing apparatus and a computer-readable recording medium that stores the program can be provided.

Advantageous Effects of Invention

With the configuration, a minimum necessary amount of physical resources can be provided so that services can be continuously provided even if part of the physical machines stops. The determined allocation configuration is obtained objectively as an optimal solution to the optimization problem in consideration of the load characteristics of the server functions. This therefore allows the amount of the physical resources of the entire system to be reduced in dependence on the result.

FIG. 1 is a schematic diagram of a virtualization system according to a first embodiment of the present invention. The virtualization system 100 of this embodiment includes a plurality of physical machines 110 and an allocation-configuration managing unit 120, which are individually connected to a network 102. The physical machines 110 each include physical resources, such as a processor, a memory, and a network adaptor. A virtualization mechanism called a hypervisor operates on the physical machines 110. The physical resources provided by the physical machines 110 are abstracted by the virtualization mechanism operating on the physical machines 110, so that virtualized computers, that is, virtual machines are implemented on the physical resources.

The virtual machines are so-called system virtual machines, which can be system virtual machines with any architectures, for example, virtual machines using hardware physical partitioning such as physical partitioning (PPAR), a dynamic system domain (DSD), and n-partitioning (nPar); virtual machines using hardware logical partitioning such as logical partitioning (LPAR), a logical domain (LDOM), and virtual partitioning (vPar); and virtual machines using software partitioning such as bare metal and host virtualization Oss. However, there is no particular limitation. In preferred embodiments, the virtual machines using hardware logical partitioning can be employed in view of performance, reliability, and the fineness of resource allocation.

Figure 2:
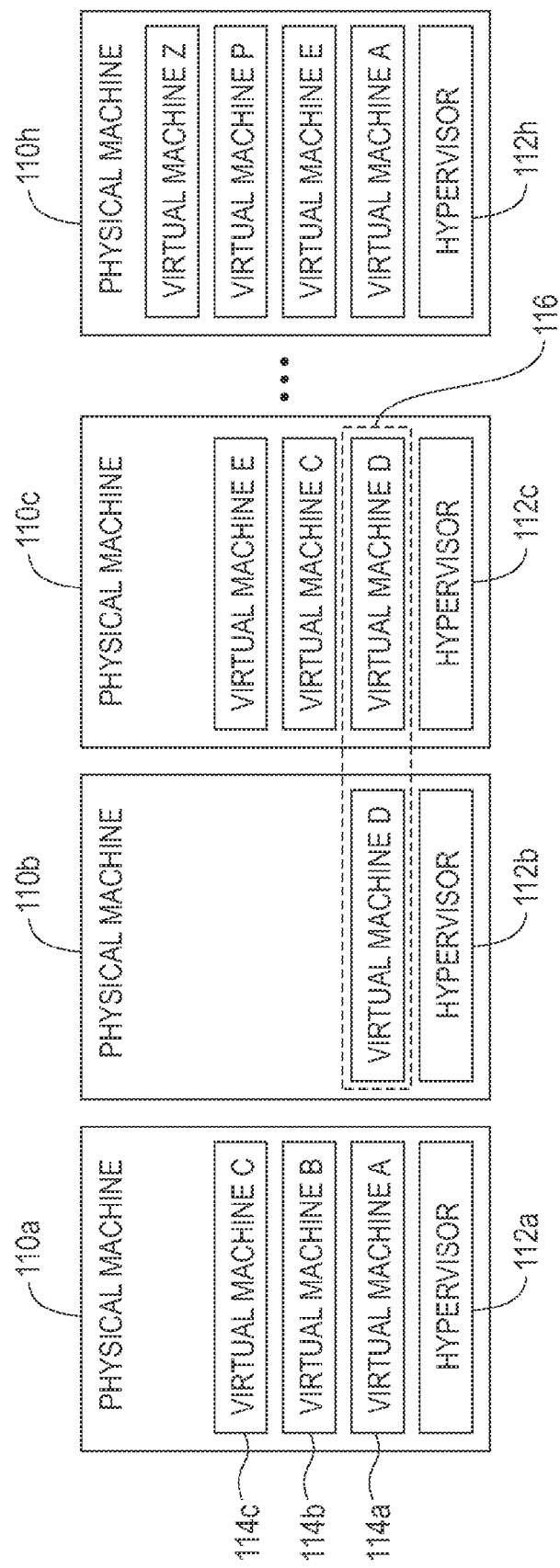
FIG. 2 is a diagram illustrating virtual machines allocated on physical machines with a predetermined allocation configuration and operating thereon in a virtualization system according to the first embodiment of the present invention.

FIG. 2 is a diagram illustrating virtual machines allocated with a predetermined allocation configuration on physical machines and operating thereon in the virtualization system according to the first embodiment of the present invention. FIG. 2 shows virtual machines with the foregoing logical partitioning architecture. As shown in FIG. 2, hypervisors 112a to 112h operate on physical machines 110a to 110h, respectively, on which one or more virtual machines (logical partitioning: LPAR) 114 (in FIG. 2, representative virtual machines are denoted by reference signs 114a, 114b, and 114c) operate.

The virtual machines 114 provide server functions that belong to any of consolidated operating systems. OSs (not shown) that implement the server functions operate on the virtual machines 114. The virtual machines 114 can belong, although not particularly limited, to a cluster with an active-standby allocation configuration (hereinafter referred to as an A-S configuration) constituted by an active system and a standby system or to a cluster with an active-active allocation configuration (hereinafter referred to as an A-A configuration) constituted by a plurality of active systems. The cluster with the A-S configuration includes an active virtual machine called an active system, and a standby virtual machine called a standby system and shares processes for the server functions in terms of time in such a manner that one serves as an active system while the other is on standby, and the standby system becomes an active system when the active system stops due to a fault or the like. In contrast, the cluster with the A-A configuration includes a plurality of active virtual machines, which are active systems in which the virtual machines operate at the same time to share the processes for the server functions of the entire cluster in terms of volume. In any allocation configurations, virtual machines that belong to the same cluster are normally allocated on different physical machines in the viewpoint of balancing the loads and improving fault resistance. FIG. 2 shows a cluster (operating system) 116 including two virtual machines allocated on different physical machines, in a dotted line, as a representative.

Figure 3:
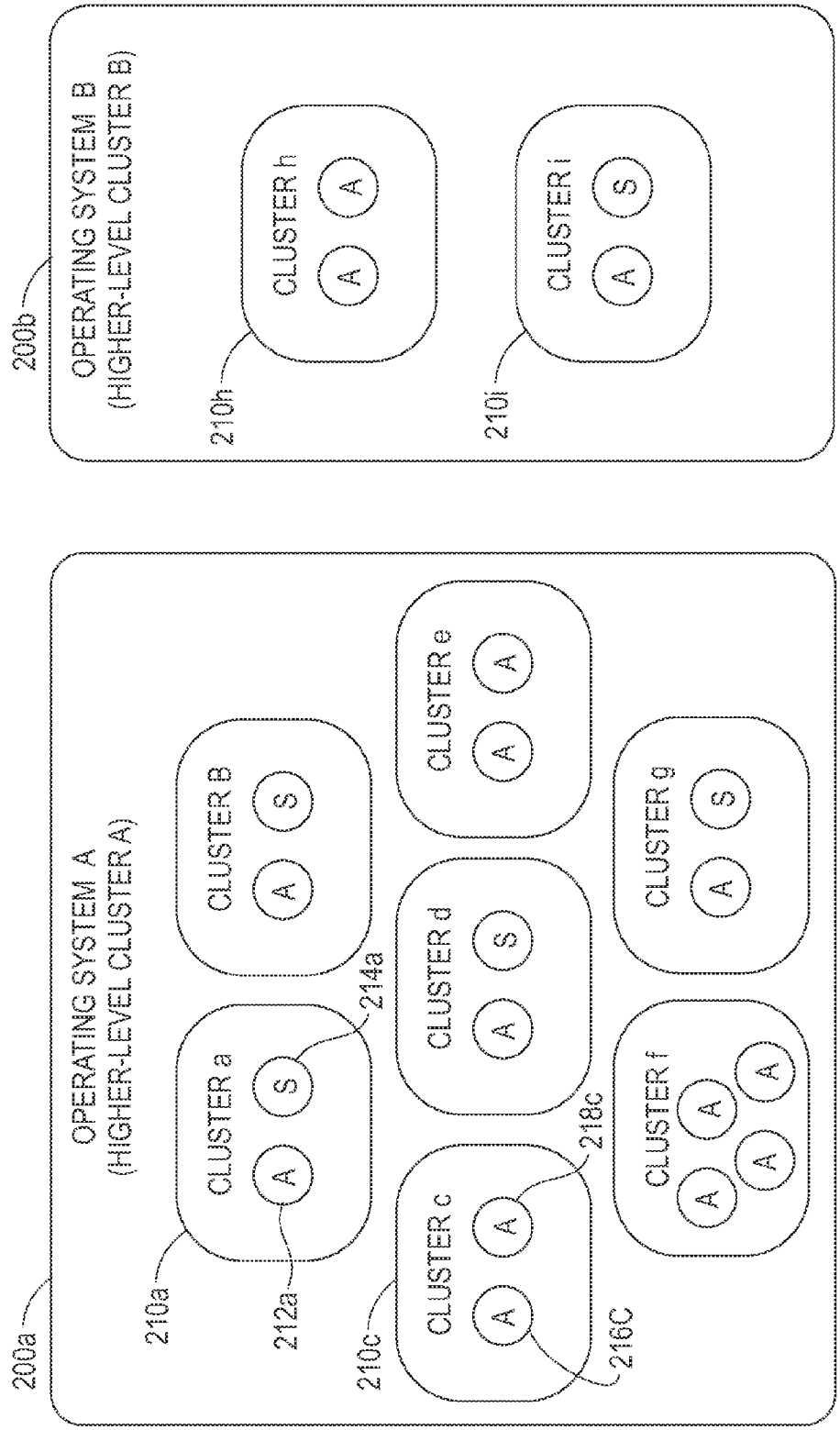
FIG. 3 is a diagram illustrating the relationship among operating systems, clusters, and virtual machines.

The relationship among operating systems, clusters, and virtual machines will be described. Operating systems consolidated in the virtualization system 100 of this embodiment each have one or more server functions. The server functions are associated with clusters, and processes for the individual server functions are shared by a plurality of virtual machines in corresponding one of the clusters. In other words, the operating systems, if having a single (or seemingly single) server function, matches a single cluster, and if having a plurality of server functions, matches a higher-level cluster 200 composed of a plurality of clusters 210, as shown in FIG. 3.

The clusters 210 that belong to the higher-level cluster 200 can be configured as an A-S configuration cluster composed of an active virtual machine 212a and a standby virtual machine 214a (in FIG. 3, a cluster a is shown as an example, the same applies hereinafter), an A-A configuration cluster composed of a plurality of active virtual machines 216c and 218c (in FIG. 3, a cluster c is shown as an example), a virtual machine with a single configuration, or a mixture thereof. When the higher-level cluster 200 is to be formed, it is sometimes preferable to allocate virtual machines that belong to the same higher-level cluster to different physical machines because of the presumption that the load characteristics of clusters that belong to the same higher-level cluster 200 can be similar to each other and the limitation that virtual machines that belong to the same higher-level cluster 200 should be prevented from stopping at the same time. As will be hereinafter described in detail, the allocation configuration of virtual machines can be derived in consideration of the relationship among higher-level clusters to which clusters belong, as described above. The first embodiment is described on the assumption that operating systems and clusters are in one-to-one correspondence.

Referring again to FIG. 1, the allocation-configuration managing unit 120 has an allocation-configuration optimizing function of determining an optimal allocation configuration of the virtual machines 114 relative to the physical machines 110. Server consolidation needs more consideration for the combination of operating systems allocated on the same physical machine. For example, appropriately combining the virtual machines of operating systems having different load characteristics and allocating them on physical machines will smooth the load peak of the physical machines, thus further improving the resource use efficiency and server consolidation. On the other hand, individual operating systems significantly differ in load characteristics, such as load peak time zone and load distribution. Thus, the allocation-configuration managing unit 120 of this embodiment deals with the problem of deriving the allocation configuration of the virtual machines 114 relative to the physical machines 110 as an optimization problem incorporating the load characteristics of the operating systems and thus derives an allocation configuration for minimizing the total amount of physical resources over the entire physical machines 110 to which the virtual machines 114 are allocated. Furthermore, the allocation-configuration managing unit 120 can allocate the virtual machines 114 on the physical machines 110 in accordance with the derived allocation configuration.

The allocation-configuration managing unit 120 is generally configured as a general-purpose computer system including one or a plurality of computers, such as a personal computer, a workstation, a rack-mount server, a blade server, and a mainframe. More specifically, the allocation-configuration managing unit 120 is equipped with hardware resources, for example, a CPU, such as a single core processor and a multicore processor, a cache memory, a RAM, a network adaptor, and a storage device, and implements the function of optimizing the allocation configuration of virtual machines under the control of an appropriate OS, such as Windows (registered trademark), UNIX (registered trademark), LINUX (registered trademark), an AIX (registered trademark). Although the following embodiments are described on the assumption that the allocation-configuration managing unit 120 operates on a physical system different from the physical machines 110, in another embodiment, the function of the allocation-configuration managing unit 120 can be implemented on a virtual machine on one or a plurality of physical machines.

The allocation-configuration managing unit 120 further provides a management interface for managing various virtualization environment settings via a user interface including a display and an input device provided at the allocation-configuration managing unit 120 or via a remote interface. The manager can give various instructions, such as derivation of an optimal allocation configuration, execution of allocation or reallocation according to the derived allocation configuration, using the input device or a client terminal connected to the remote interface.

The network 102 is a network that connects the physical machines 110 to one another via a network adaptor. An example is a local area network, such as Gigabit Ethernet (registered trademark), which is not particularly limited. In another embodiment, the network 102 can also be configured as a wide area network in which LANs at different locations are connected via a dedicated line or a public line using a virtual private network (VPN). Furthermore, in another embodiment, the physical machines 110 can be connected to one another via a storage area network (SAN) (not shown) using a fiber channel.

Referring to FIGS. 4 to 10, the virtual-machine allocation configuration optimization process according to the first embodiment of the present invention will be described in more detail.

Figure 4:
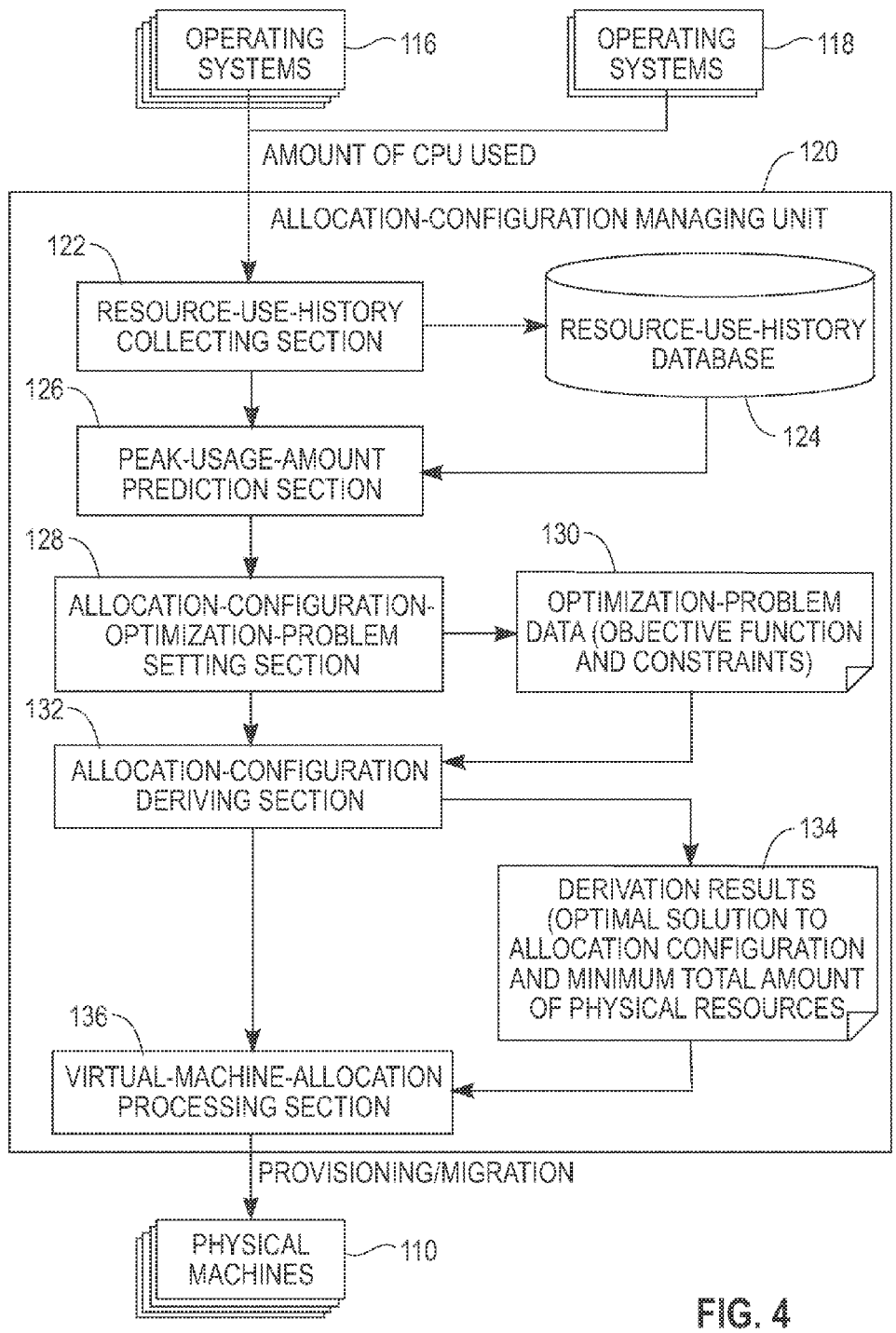
FIG. 4 is a functional block diagram of a virtualization system according to the first embodiment of the present invention.

FIG. 4 is a functional block diagram of the virtualization system according to the first embodiment of the present invention. FIG. 4 shows a plurality of physical machines 110, a plurality of operating systems 116 operating on a server consolidation environment constructed over the plurality of physical machines 110, unconsolidated operating systems 118, and a functional block constructed on the allocation-configuration managing unit 120.

The allocation-configuration managing unit 120 includes a resource-use-history collecting section 122 and a resource-use-history database 124. The resource-use-history collecting section 122 communicates with the individual operating systems 116 operating in a virtualization environment to obtain physical-resource use-history information on the individual clusters (in this embodiment, corresponding to the operating systems, the same applies hereinafter) and stores it in a resource-use-history database 124. Alternatively, the resource-use-history collecting section 122 imports a file that stores the history information on the unconsolidated operating systems 118 to be consolidated to the virtual environment to obtain the physical-resource use-history information and stores it in the resource-use-history database 124. The use-history information on the clusters cluster reflects the load characteristics of the clusters and is used to predict the future demand of the physical resources in the individual clusters, as will be hereinafter described in detail.

Although physical resources whose use-history information is collected are preferably physical processors, there is no particular limitation. For example, physical hardware such as a physical memory, a physical network adaptor, and a physical storage can be adopted. In this specification, virtualized hardware is given the term "virtual" to distinguish it from physical hardware, and physical hardware is given the term "physical".

The use-history information of physical resources can be obtained as time series data of the amount of physical resource used sampled at predetermined intervals. Preferably, the amount of physical resources used is, although not particularly limited, the usage factor of physical resources indicating the proportion of physical resource actually used, or in the case where physical resources can be dynamically allocated, the amount of physical resources allocated to virtual machines, which are appropriately converted. The physical-resource usage factor can be used as information reflecting the detailed load of the entire operating systems 116 and 118 or servers (virtual machines) in the operating systems 118. In an architecture in which, for example, the number of processors to be allocated to virtual machines can be dynamically changed depending on the load the amount of processors allocated can also be used as information reflecting the load. The number of processors, which is the amount of physical resources allocated in this case, is expressed in a unit smaller than 1 (for example, at the decimal level) in the case where an architecture in which the throughput can be allocated to virtual machines in a unit smaller than 1, such as a micropartitioning function, is employed. In other words, the amount of physical resources used substantially matches the amount of physical resources actually consumed by the operating systems 116 and 118 at some point.

Use-history information, which is obtained by the resource-use-history collecting section 122 and is stored in the resource-use-history database 124, is not particularly limited provided that it can be obtained from the operating systems 116. The use-history information can be obtained as the total usage amount of physical resources over the entire clusters or the individual usage amounts of physical resources broken down in units of virtual machines or physical servers that belong to a cluster. In the following embodiments, an architecture in which the number of processors can be dynamically changed in units of fine grain is employed, and the resource-use-history collecting section 122 obtains the time series data of the total usage amount of physical processors in the entire cluster sampled at predetermined intervals.

The allocation-configuration managing unit 120 further includes a peak-usage-amount prediction section 126. The peak-usage-amount prediction section 126 determines a data set serving as a base for optimizing an allocation configuration, to be described later, from use-history information on individual clusters stored in the resource-use-history database 124. The data set is used to predict the future demand of the physical resources in the case where all the target operating systems 116 and 118 are consolidated into the virtualization system 100 and includes the total predicted peak usage amount of physical resources in the entire clusters c, which is sorted out for each time interval t, or the individual predicted peak usage amounts of physical resources in units of virtual machines in the individual clusters c.

The time interval t is for characterizing the temporal load characteristic of the clusters and can be preferably defined as a plurality of time zones divided from a day. In this case, if time series data of the total usage amount of physical processors in the entire clusters is stored in the resource-use-history database 124, the time series data is divided by the time zones in a cycle of one day, and peak values in the divided individual time intervals are obtained. When the peaks are to be obtained, the time series data can be subjected to appropriate processing, such as weighted averaging, to exclude sudden load changes. In another embodiment, the time interval t is not limited to the time zone but can be any time interval. For example, the time series data can be sorted out at time intervals with a plurality of time intervals as a cycle, can be sorted out by the day of the week in a cycle of a week, or can be sorted out by the first, second, and last ten days of a month in a cycle of a month.

Figure 5A:
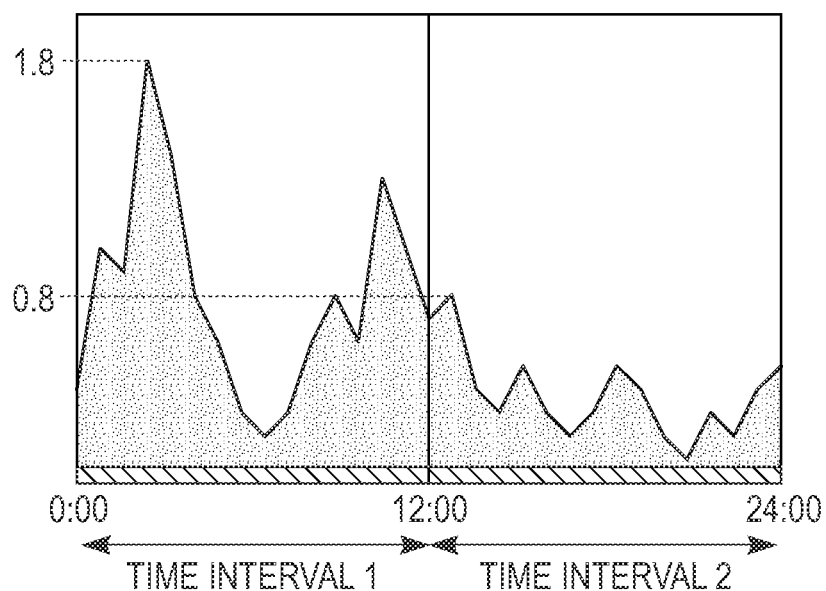
FIG. 5 shows diagrams illustrating a method for obtaining the total predicted peak usage amount of physical resource of the entire clusters for each time interval and the individual predicted peak usage amount of virtual machines from the use-history information.
Figure 5B:
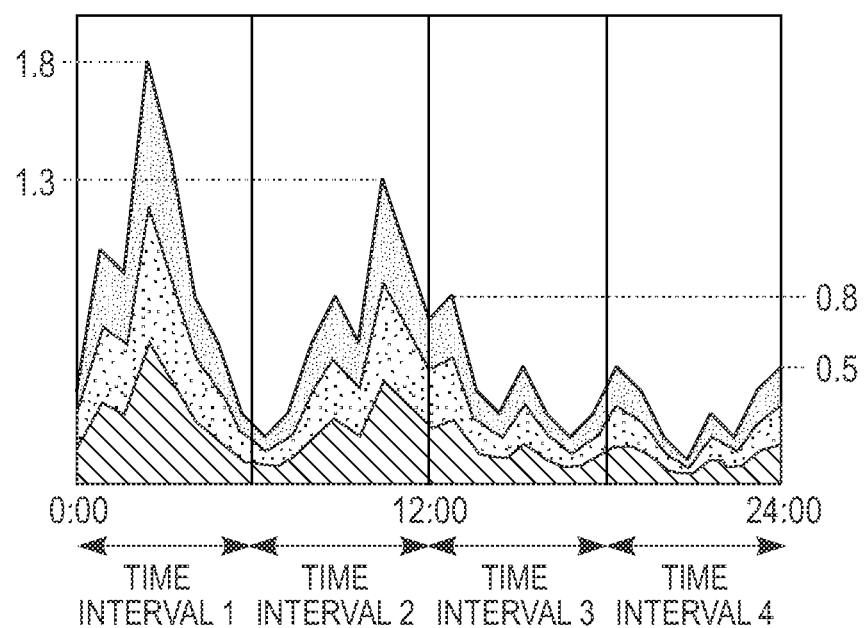

FIG. 5 shows diagrams illustrating a method for finding the total predicted peak usage amount of physical resources of the entire clusters at each time interval t or the predicted peak usage amount of each virtual machine from obtained use-history information. FIG. 5(A) illustrates a case in which the data is divided into two in a cycle of one day. FIG. 5(B) illustrates a case in which the data is divided into four in a cycle of one day. As shown in FIG. 5, the peak-usage-amount prediction section 126 extracts one day's time series data from the time series data of the total usage amount of physical processors in the entire clusters, divides it by 12 hours, and obtains peak values in the individual intervals. In the embodiment, although data corresponding to one cycle is extracted from the time series data, data corresponding to two or more cycles can be superimposed one on another.

Which of the total predicted peak usage amount of the physical resources of the entire cluster and the individual predicted peak usage amounts of the virtual machines is to be determined is described as follows. In this embodiment, for an A-S configuration cluster, the standby virtual machine uses a minimum amount of physical resources and the active virtual machine uses physical resources depending on the load. Since the predicted peak usage amount determined here is used to ascertain the load states of the individual virtual machines, individual predicted peak usage amounts $\alpha_{i,t}$ and $\sigma_{i,t}$, which are broken down for the active and standby virtual machines, are determined for a cluster i with the A-S configuration. The individual predicted peak usage amount $\sigma_{i,t}$ of the standby virtual machine is approximately a minimum necessary fixed amount, while the individual predicted peak usage amount $\alpha_{i,t}$ of the active virtual machine is a value reflecting the load state of the operating system. FIG. 5(A) shows the total predicted peak usage amount of the physical processors of the entire A-S configuration cluster i, the individual predicted peak usage amount of the active virtual machine, and the individual predicted peak usage amount of standby virtual machine. In FIG. 5(A), substantially fixed values indicate the values of the standby virtual machine.

In contrast, for an A-A configuration cluster j, loads are allocated to the individual virtual machines substantially equally or depending on given weighting, and the individual virtual machines use physical resources depending on the load state. Therefore, for the A-A configuration cluster j, if the load is allocated substantially equally, individual predicted peak usage amounts can be obtained by dividing the total predicted peak usage amount $\pi_{j,t}$ by parallel number $\rho_j$ provided that at least the total predicted peak usage amount $\pi_{j,t}$ of the entire cluster is determined. FIG. 5(B) expresses the total predicted peak usage amount of the physical processors in the entire A-A configuration cluster j and the individual predicted peak usage amounts broken down by the virtual machines, with the fill density changed.

Referring again to FIG. 4, the allocation-configuration managing unit 120 further includes an allocation-configuration-optimization-problem setting section 128, an allocation-configuration deriving section 132, and a virtual-machine-allocation processing section 136. The allocation-configuration-optimization-problem setting section 128 deals with the problem of obtaining an optimal allocation configuration for allocating virtual machines to physical machines as an optimization problem and sets data describing the optimization problem including an objective function and constraints (hereinafter referred to as optimization problem data) 130. Here, the objective function is the sum total of physical resource amounts $z_k$ of a plurality of target physical machines k (k=1, ..., K), and the optimization problem is a problem that a solution to decision variables that define the allocation configuration of virtual machines for immunizing the sum total $\Sigma z_k$ of the physical resource amount of all of a plurality of physical machines is obtained in accordance with predetermined constraints, as shown in Exps. (1) and (2).

Formula 1

$$\text{minimize} \sum_{k \in K} z_k \quad (1)$$

$$\text{subject to } \phi_{k,k',t} \leq z_k, k \in K, \forall k' \neq k, \forall t \quad (2)$$

Exp. (2) is a constraint to be satisfied for all the physical machines k (k∈K: K is a set of physical machines); in the constraint (2), $\phi_{k,k',t}$ indicates the total predicted peak usage amount of physical resources predicted for the physical machines k when another physical machine k' stops during the time interval t. In other words, the constraint (2) is a condition for ensuring that a sufficient physical resource can be ensured even if at least one physical machine stops during a fault or maintenance. The total predicted peak usage amount $\phi_{k,k',t}$ of the physical machines k can be obtained using data set that the foregoing peak-usage-amount prediction section 126 determined, as will be hereinafter described in detail.

Figure 6:
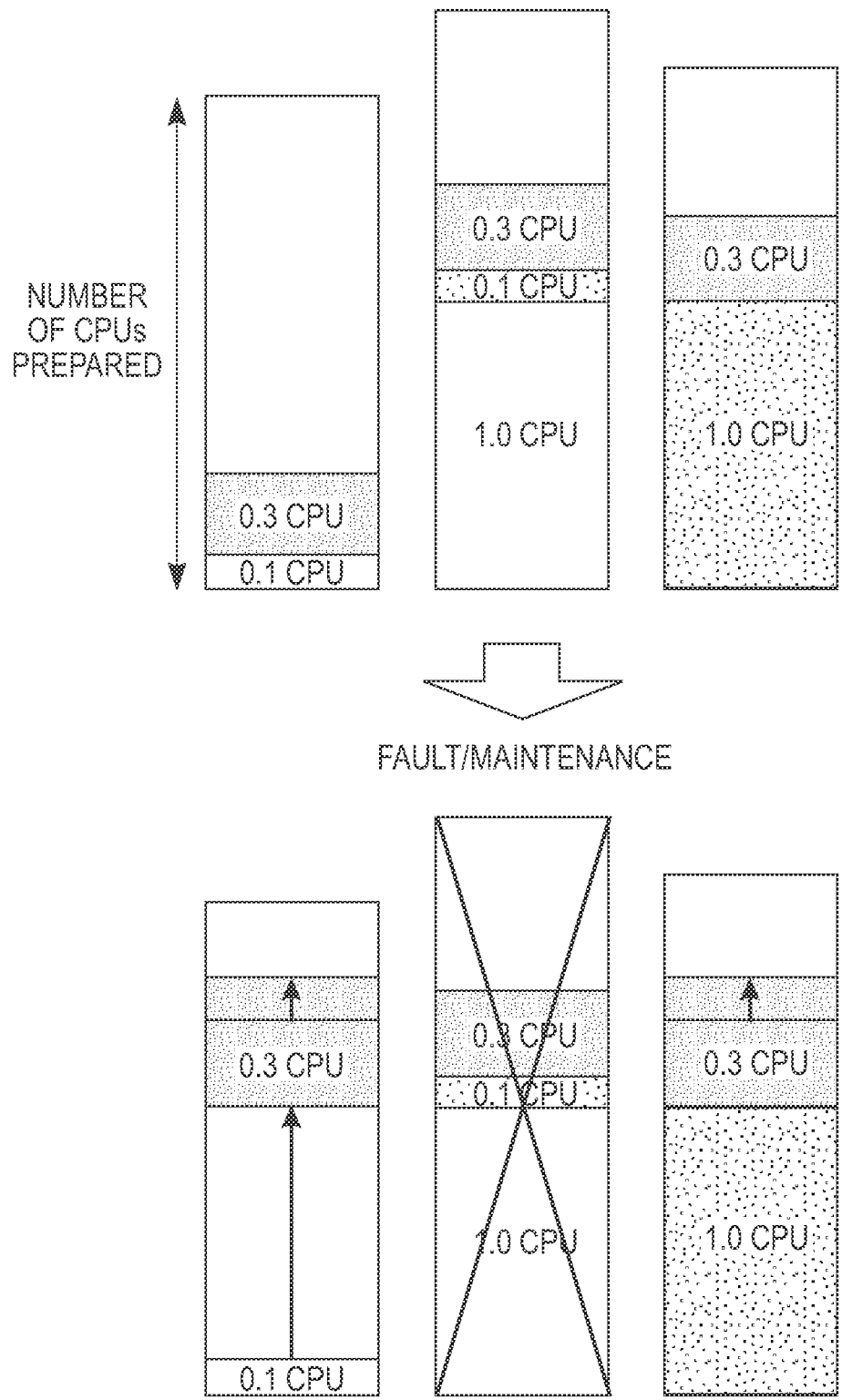
FIG. 6 is a diagram illustrating, when one physical machine stops due to a fault or maintenance, changes in the physical resource usage amount of virtual machines allocated on the remaining physical machines.

FIG. 6 is a diagram illustrating, in the case where one physical machine stops due to a fault or maintenance, changes in the usage amount of physical resources of virtual machines allocated on the remaining physical machines. As shown in FIG. 6, the individual physical machines have physical processors that can be allocated to virtual machines. Here, if the central physical machine stops due to a fault or the like, the virtual machines on the other physical machines corresponding to the virtual machines that were operating on the central physical machine before the stop increase the usage amount of the physical processors. In the example shown in FIG. 6, as the active virtual machines (white) on the central physical machine stop, standby virtual machines (white) that belong to the same A-S configuration cluster on the left physical machine are activated. Likewise, as the active virtual machine (dark gray) on the central physical machine stops, the corresponding active virtual machines (dark gray) on the right and left physical machines increase the usage amount of physical processors.

In this manner, as one physical machine stops, the usage amounts of physical resources of the corresponding virtual machines on the other physical machines are increased to take over the process load that the virtual machines on the stopped physical machine bore. In this case, to permit the physical machine to stop, the amount of physical resources prepared for the remaining physical machines needs to be sufficient to bear the process load that the stopped physical machine bore. Furthermore, such a condition needs to be satisfied in any combinations.

The constraint (2) shows that the total predicted peak usage amount $\phi_{k,k',t}$ of the physical resources predicted for the physical machines k does not exceed a physical resource amount $z_k$ prepared for the physical machines k for all combinations of k'($\neq$k) and t. As long as this constraint is satisfied, it is ensured that a sufficient physical resource amount is ensured even if one physical machine stops. On the other hand, achieving high resource use efficiency requires minimizing the amount of physical resources prepared. This is achieved by minimizing the sum total $\Sigma z_k$ of physical resource amounts of all physical machines under the above constraint.

The allocation-configuration deriving section 132 reads the optimization-problem data 130 that the allocation-configuration-optimization-problem setting section 128 has set and strictly or approximately solves the optimization problem to calculate an optimal solution to decision variables. The decision variables express the allocation configuration of virtual machines. An optimal allocation configuration is defined by the derived optimal solution to the decision variables. The optimization problem can be solved by using a known mathematical programming solver of IBM (registered trademark), ILOG (registered trademark), CPLEX (registered trademark), LINDO (registered trademark), NUOPT (registered trademark), lp_solve, or the like. Here, "strictly solve" refers to a solution technique whereby an optimal solution is found when the solution converges until given converging conditions are satisfied. "Approximately solve" refers to a solution technique whereby solving operations are repeated until a predetermined truncation condition, for example, the number of times of truncation, is satisfied, and a solution that is obtained when the truncation condition is satisfied is found as an optimal solution time. When the optimal solution to the decision variables is found, the allocation-configuration deriving section 132 derives the allocation configuration of virtual machines from the optimal solution of the decision variables and further derives the sum total $\Sigma z_k$ of the physical resource amounts of all the physical machines and the physical resource amounts $z_k$ of the individual physical machines, and outputs the amounts as an operation result 134 including information on an optimal allocation configuration and minimum necessary physical resources. The optimization problem will be described hereinbelow in more detail with reference to a flowchart.

The virtual-machine-allocation processing section 136 performs the process of allocating virtual machines on corresponding physical machines 110, in response to obtaining manager's agreement after presenting the operation result 134 or automatically, in accordance with the derived virtual-machine allocation configuration. The allocation of the virtual machines on the physical machines 110 can be performed by provisioning the virtual machines on the physical machines 110 or migrating the virtual machines to corresponding physical machines from the present physical machine. Using the techniques of live migration, live partition mobility (LPM), and so on allows reallocation of virtual machines to be achieved without down time during the operation of the virtual machines.

Figure 7:
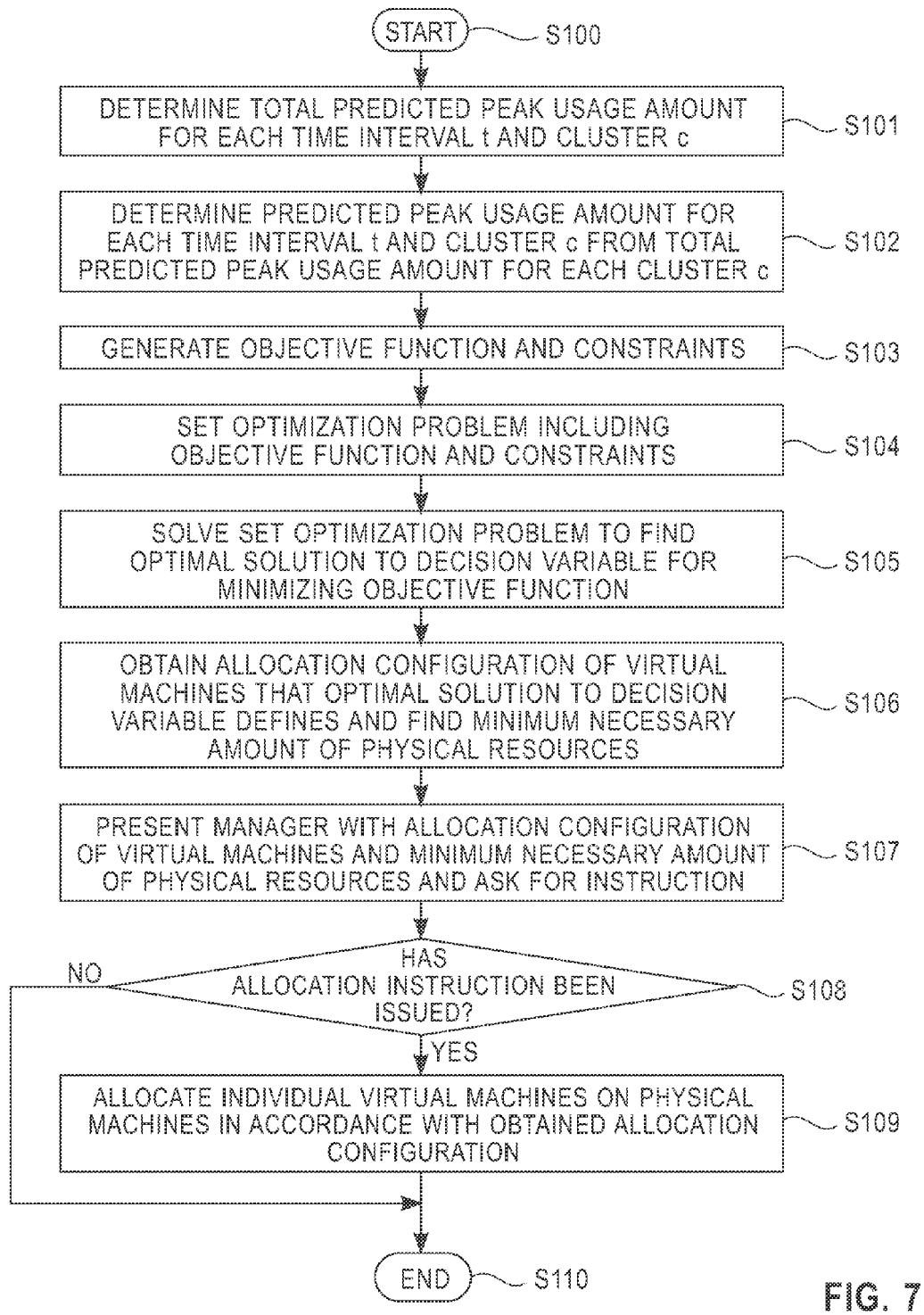
FIG. 7 is a flowchart showing the process of deriving an optimal allocation configuration that an allocation-configuration managing unit according to the first embodiment executes.

FIG. 7 is a flowchart showing the process of deriving an optimal allocation configuration that the allocation-configuration managing unit 120 according to the first embodiment executes. The process shown in FIG. 7 is started from step S100 in response to, for example, an explicit instruction from the manager via the user interface or the remote interface described above. In step S101, the peak-usage-amount prediction section 126 reads history information from the resource-use-history database 124 and determines a total predicted peak usage amount for each time interval t and cluster c. In step S102, an individual predicted peak usage amount for each time interval t and virtual machine is determined from the total predicted peak usage amount for each cluster c, for at least the A-S configuration cluster i.

In step S103, the allocation-configuration-optimization-problem setting section 128 generates an optimization problem including an objective function and constraints and describes the optimization problem in the optimization-problem data 130. The optimization problem in the first embodiment is expressed as a 0-1 integer linear programming problem expressed by Exps. (3) to (8).

Formula 2

$$\text{minimize} \sum_{k=1}^{K} z_k \quad (3)$$

$$\text{subject to: } x_{i,p} \in \{0, 1\}, \forall i \in [1, I], \forall p \in P \quad (4)$$

$$y_{j,q} \in \{0, 1\}, \forall j \in [1, J], \forall q \in Q \quad (5)$$

$$\sum_{p \in P} x_{i,p} = 1, \forall i \in [1, I] \quad (6)$$

$$\sum_{q \in Q} y_{j,q} = 1, \forall j \in [1, J] \quad (7)$$

-continued $$\sum_{i=1}^{I}\left(\sum_{p\in A_k\cup(S_k\cap A_{k'})}a_{i,t}x_{i,p}+\sum_{p\in S_k\cap(\neg A_{k'})}s_{i,t}x_{i,p}\right)+ \qquad (8)$$
$$\sum_{j=1}^{J}\left(\sum_{q\in Q_k\cap Q_{k'}}\frac{c_{j,t}}{|q|-1}y_{j,q}+\sum_{q\in Q_k\cap(\neg Q_{k'})}\frac{c_{j,t}}{|q|}y_{j,q}\right)\leq z_k,$$

$$\forall k \in [1, K], \forall k' \in [1, K]\setminus\{k\}, \forall t \in [1, T]$$

where:

I is the number of clusters with the A-S configuration;
J is the number of clusters with the A-A configuration;
K is the number of physical machines;
T is the number of time intervals;
P is a set of virtual-machine allocation patterns with the A-S configuration;
Q is a set of virtual-machine allocation patterns with the A-A configuration;
$A_k$ is a set of virtual-machine allocation patterns with the A-S configuration in which active virtual machines are allocated on the physical machines k ($\in$P);
$S_k$ is a set of virtual-machine allocation patterns with the A-S configuration in which standby virtual machines are allocated on the physical machines k ($\subseteq$P);
$Q_k$ is a set of virtual-machine allocation patterns with the A-A configuration in which virtual machines are allocated on the physical machines k ($\subseteq$Q);
$|q|$ is the number of virtual machines included in a virtual-machine allocation pattern q;
$x_{i,p}=1$ is equivalent to allocation of the A-S configuration clusters i in a virtual-machine allocation pattern p;
$y_{j,q}=1$ is equivalent to allocation of A-A configuration clusters j in the virtual-machine allocation pattern q;
$a_{i,t}$ is the predicted peak usage amount of each of the physical processors of active virtual machines in the A-S configuration cluster i during the time interval t;
$s_{i,t}$ is the predicted peak usage amount of each of the physical processors of standby virtual machines in the A-S configuration clusters i during the time interval t; and
$c_{j,t}$ is the total predicted peak usage amount of physical processors in the A-A configuration clusters j during the time interval t.

Decision variables in the 0-1 integer linear programming problem include $x_{i,p}$ that defines the allocation of virtual machines in the A-S configuration cluster i defined by Exps. (4) and (5) and $y_{j,p}$ that defines the allocation of virtual machines in the A-A configuration cluster j, which can take either "0" or "1". Exps. (6) and (7) mean that the individual clusters are expressed in either of the virtual-machine allocation patterns. The individual predicted peak usage amounts, $a_{i,t}$ and $s_{i,t}$ and the total predicted peak usage amount, $c_{j,t}$ can be obtained in step S102 and step S101, respectively.

Figure 8:
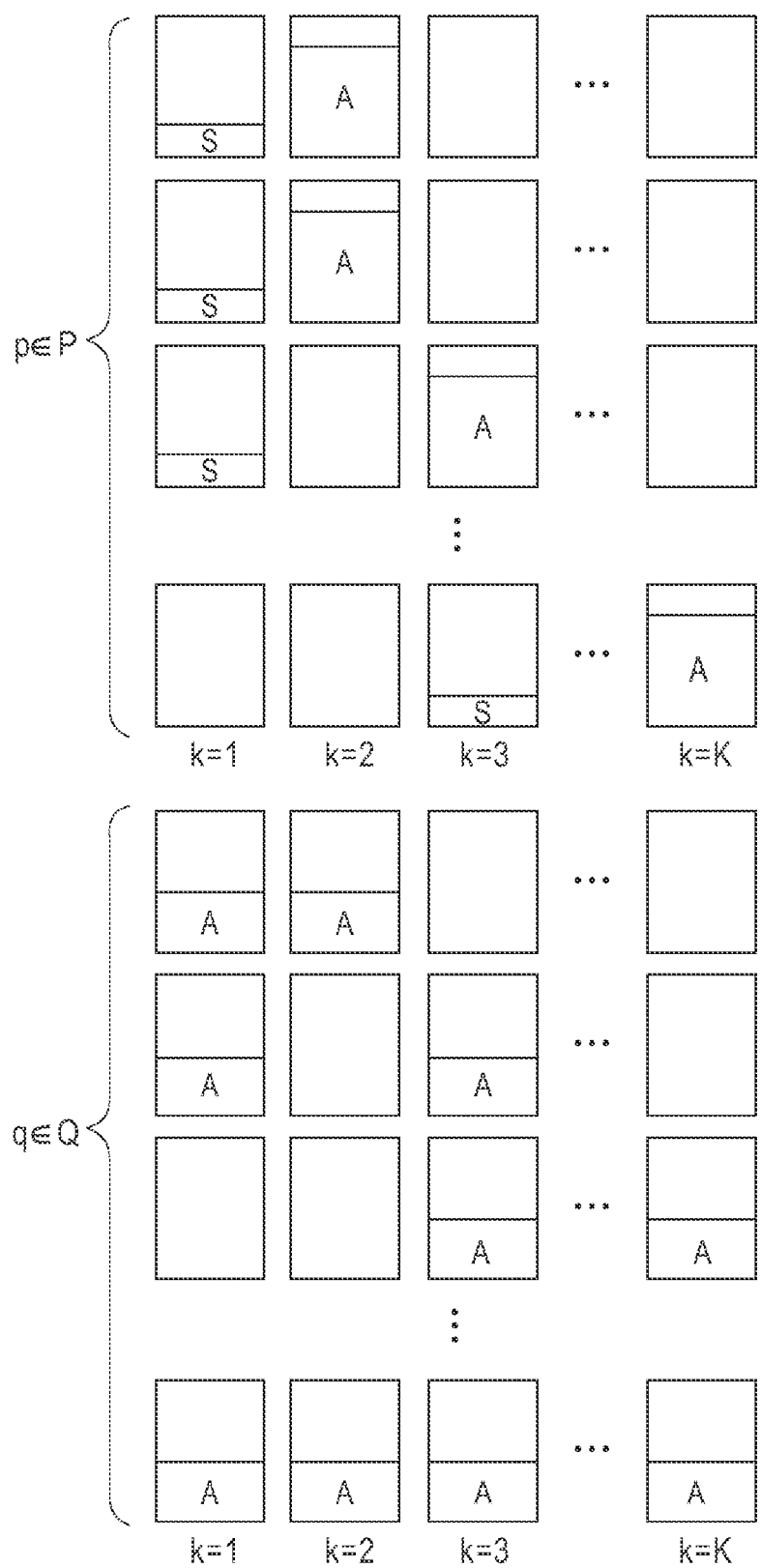
FIG. 8 is a diagram illustrating a set of allocation patterns of virtual machines that an A-S configuration cluster and an A-A configuration cluster can take in the first embodiment.

FIG. 8 is a diagram illustrating sets of virtual-machine allocation patterns that the A-S configuration cluster i and the A-A configuration cluster j can take. In FIG. 8, "A" and "S" mean that the active virtual machine and the standby virtual machine are allocated, respectively. As shown in FIG. 8, the set P includes all virtual-machine allocation patterns of the A-S configuration including active and standby virtual machines, in which any of the virtual-machine allocation patterns have active and standby virtual machines on the same physical machine. Likewise, the set Q includes all virtual-machine allocation patterns of the A-A configuration including two virtual machines or more and equal to or smaller than the number of physical machines, in which any of the virtual-machine allocation patterns have a plurality of active virtual machines on the same physical machine.

The above Exp. (8) corresponds to the above constraint (2) and is ensured for the individual physical machines k and expresses a constraint that, for all combinations of k' and t, the total predicted peak usage amount of physical resources of each of the physical machines k when the other physical machine k' stops during the time interval t does not exceed the physical resource amount $z_k$ prepared for the physical machine k. The left side of Exp. (8) corresponds to the total predicted peak usage amount $\phi_{k,k'},t$ in Exp. (2).

Of the left side of Exp. (8), the sum total $\Sigma$ for "i" in the first term means that the predicted peak usage amounts of the A-S configuration clusters i generated in the physical machines k when the other physical machine k' stops during the time interval t is summed up for all the A-S configuration clusters i (i=1, ..., I). Likewise, of the left side of Exp. (8), the sum total $\Sigma$ for "j" in the second term means that the predicted peak usage amounts of the A-A configuration clusters j generated in the physical machines k when the other physical machine k' stops during the time interval t is summed up for all the A-A configuration clusters j (j=1, ..., J).

Figure 9A:
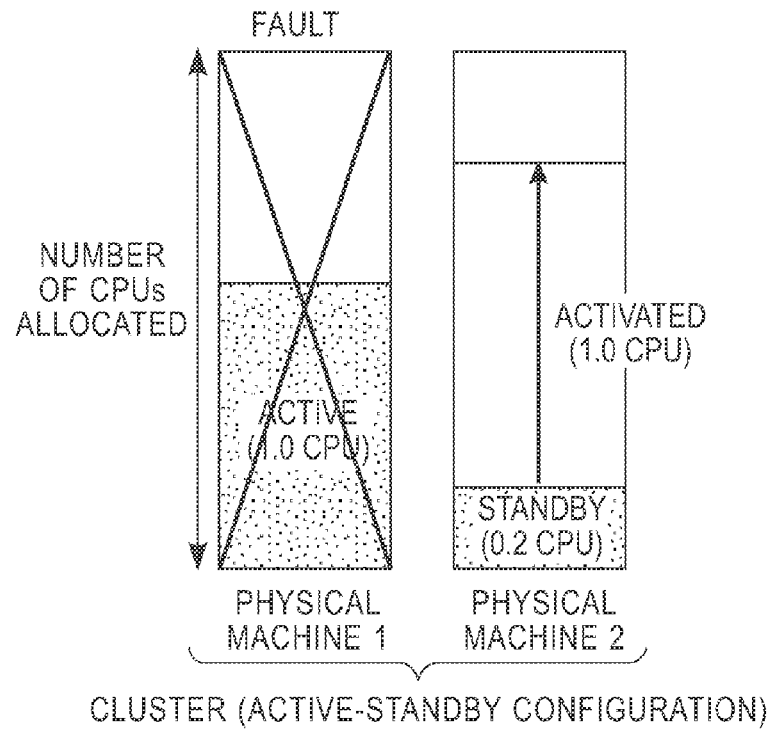
FIG. 9 shows diagrams illustrating, when one physical machine has a fault, changes in the physical resource usage amount of virtual machines allocated on the remaining physical machines.

When a decision variable $x_{i,p}$ is given, and if the decision variable $x_{i,p}$ is for allocating an active virtual machine in the A-S configuration cluster i on the physical machine k after the other physical machine k' stops (including the case of allocating an active virtual machine on the physical machine k ($p\in A_k$) and the case of allocating a standby virtual machine on the physical machine k and allocating an active virtual machine on the other physical machine k' ($p\in S_k\cap A_{k'}$)), the first sum total $\Sigma a_{i,t}x_{i,p}$ of the sum total $\Sigma$ for "i" in the first term gives the individual predicted peak usage amount $a_{i,t}$ of the active virtual machine. As shown in FIG. 9(A), in the case where a standby vertical machine is allocated on the physical machine k, and an active virtual machine is allocated on the other physical machine k' ($p\in S_k\cap A_{k'}$), when the virtual machine k' stops, the standby virtual machine on the physical machine k is activated into an active virtual machine.

Likewise, the second sum total $\Sigma s_{i,t}x_{i,p}$ gives the individual predicted peak usage amount $s_{i,t}$ of the standby virtual machine in the case where a given decision variable $x_{i,p}$ is for allocating a standby virtual machine in the A-S configuration cluster i on the physical machine k after the other physical machine k' stops (excluding the case of allocating a standby virtual machine on the physical machine k and allocating an active virtual machine on the other physical machine k'($p\in S_k\cap(\neg A_{k'})$)).

Figure 9B:
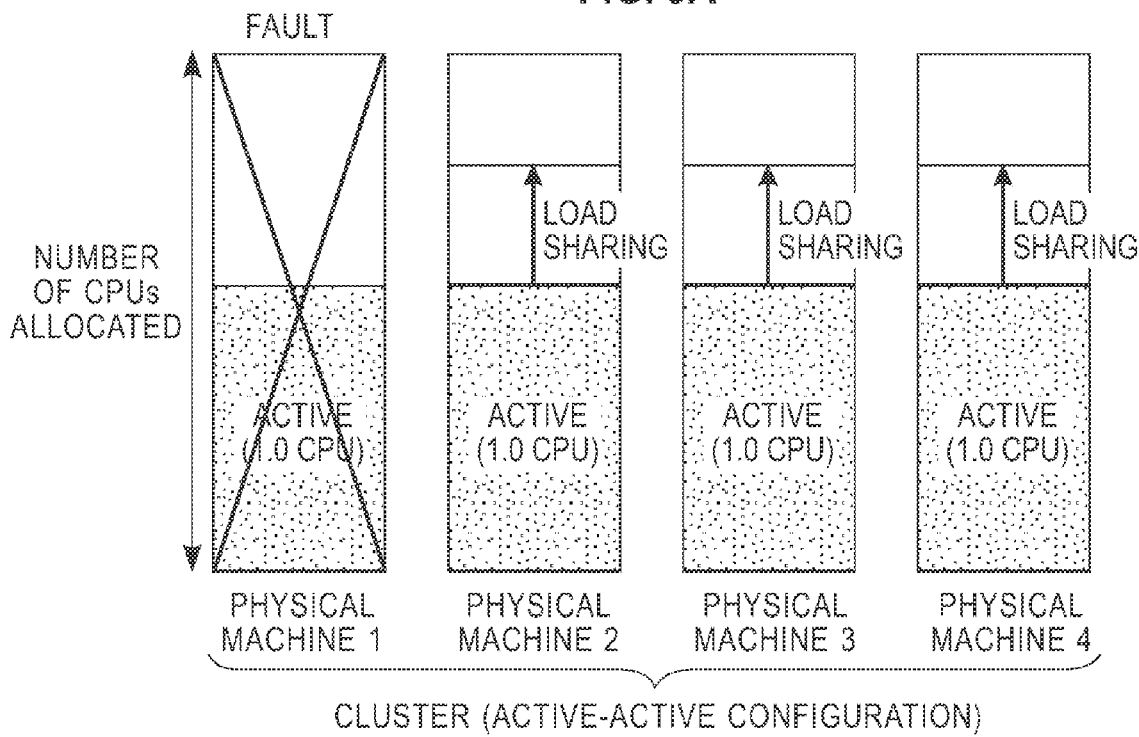

When a decision variable $y_{j,q}$ is given, and if the decision variable is for allocating an active virtual machine in the A-A configuration cluster j on the physical machine k after the other physical machine k' stops, the numbers in the parenthesis of the sum total $\Sigma$ for the A-A configuration cluster j in the second term gives the individual predicted peak usage amount of the physical processor of the active virtual machines. This individual predicted peak usage amount defers depending on whether an active virtual machine is allocated on the other physical machine k'. In the case where an active virtual machine is allocated on the physical machine k' ($q\in Q_k\cap Q_{k'}$), the individual predicted peak usage amount is equivalent to a value obtained by dividing the total predicted peak usage amount $c_{j,t}$ of the physical processors in the A-A configuration cluster j by the number of parallel virtual machines, $|q|$, $-1$, (the number of halt virtual machines) because the load of the virtual machines on the halt physical machine k' is shaped among the remaining physical machines, as shown in FIG. 9(B). In the case where no active virtual machine is allocated on the physical machine k' ($q \in Q_k \cap (\neg Q_{k'})$), the individual predicted peak usage amount is equivalent to a value obtained by dividing the total predicted peak usage amount $c_{j,t}$ by the number of parallel virtual machines, $|q|$.

Exp. (8) is summarized as follows:

(i) The sum total $\Sigma$ for the A-S configuration clusters i in the first term expresses the sum total of predicted peak usage amounts (0, $a_{i,t}$, or $s_{i,t}$) of the clusters i, each predicted for the physical machine k when the other physical machine k' stops, which is given in correspondence with the decision variable $x_{i,p}$ that defines the allocation configuration of each of the A-S configuration clusters i (i= 1, . . . , I).

(ii) The sum total $\Sigma$ for the A-A configuration clusters j in the second term expresses the sum total of predicted peak usage amounts (0, $c_{j,t}/(|q|-1)$, or $c_{j,t}/|q|$) of the clusters j each predicted for the physical machine k when the other physical machine k' stops, which is given in correspondence with the decision variable $y_{j,q}$ that defines the allocation configuration of each of the A-A configuration clusters j(j=1, . . . , J).

Exp. (8) places a constraint that the total predicted peak usage amount of all the clusters c which is predicted for the physical machines k when the other physical machines k' stop and which is given in correspondence with the decision variables $x_{i,p}$ and $y_{j,q}$ that define the allocation configuration of the clusters c (including the A-S configuration clusters i and the A-A configuration clusters j) does not exceed the amount of physical resources prepared on the physical machines k.

Referring again to FIG. 7, in step S104, the allocation-configuration-optimization-problem setting section 128 sets an optimization problem including an objective function and constraints into a mathematical programming solver. In step S105, the allocation-configuration deriving section 132 instructs the mathematical programming solver in which the optimization problem is set to execute an operation to obtain an optimal solution to the decision variables of the optimization problem. Since the optimization problem in the first embodiment is expressed as a 0-1 integer linear programming problem expressed by Exps. (3) to (8), a mathematical programming solver that implements a branch and bound algorithm or a branch and cut algorithm can be used. In step S106, the allocation-configuration deriving section 132 obtains the allocation configuration of virtual machines that the decision variables define, obtains the minimized value of an objective function corresponding to the optimal solution, as a minimum necessary physical resource amount, from the mathematical programming solver, and writes it as the operation result 134. With the 0-1 integer linear programming problem expressed by Exps. (3) to (8), the decision variables $x_{i,p}$ and $y_{j,q}$ indicate unique virtual-machine allocation patterns of the individual clusters i and j, a specific allocation configuration for mapping the virtual machines on the physical machines is obtained from the decision variables $x_{i,p}$ and $y_{j,q}$.

In step S107, the virtual-machine-allocation processing section 136 reads the operation result 134 and presents the manager with the allocation configuration of the virtual machines and the minimum necessary physical resource amount via the user interface or the remote interface to ask for instruction thereafter. In step S108, the process is branched depending on whether an instruction to perform allocation is given from the manager. In step S108, if an instruction to perform allocation is given (YES), then, in step S109, the virtual-machine-allocation processing section 136 allocates the virtual machines in the clusters onto corresponding physical machines in accordance with the obtained allocation configuration, and in step S110, terminates the process. On the other hand, if no instruction to perform allocation is given in step S108 (NO), the process is directly proceeded to step S110 and is finished in step S110.

With the allocation-configuration managing unit 120 according to the first embodiment, a sufficient amount of physical resources for continuously providing the service can be ensured even if part of the physical machines stop due to a fault, and a virtual-machine allocation configuration which minimizes the amount of physical resources of all of target physical machines can be determined. In this case, the determined allocation configuration is obtained objectively as an optimal solution to the optimization problem in consideration of the load characteristics of the server functions of the individual operating systems. This therefore allows the manager of the allocation configuration of the virtual machines to reduce the amount of the physical resources of the entire system in dependence on the result, thus allowing the resource use efficiency to be improved and allowing reduction of the cost for the facility of the entire virtualization system 100.

In the case where the determined amount of physical resources exceeds the amount of physical resources actually prepared for physical machines, physical resources, such as a physical processor and a memory, can be added to the physical machines. In addition, in the case where physical machines correspond to Capacity Upgrade on Demand (CUoD) or another technique, an additional physical processor can be provided by activating a reserve physical processor by inputting a given code from a console terminal or the like in response to a user request.

Figure 10:
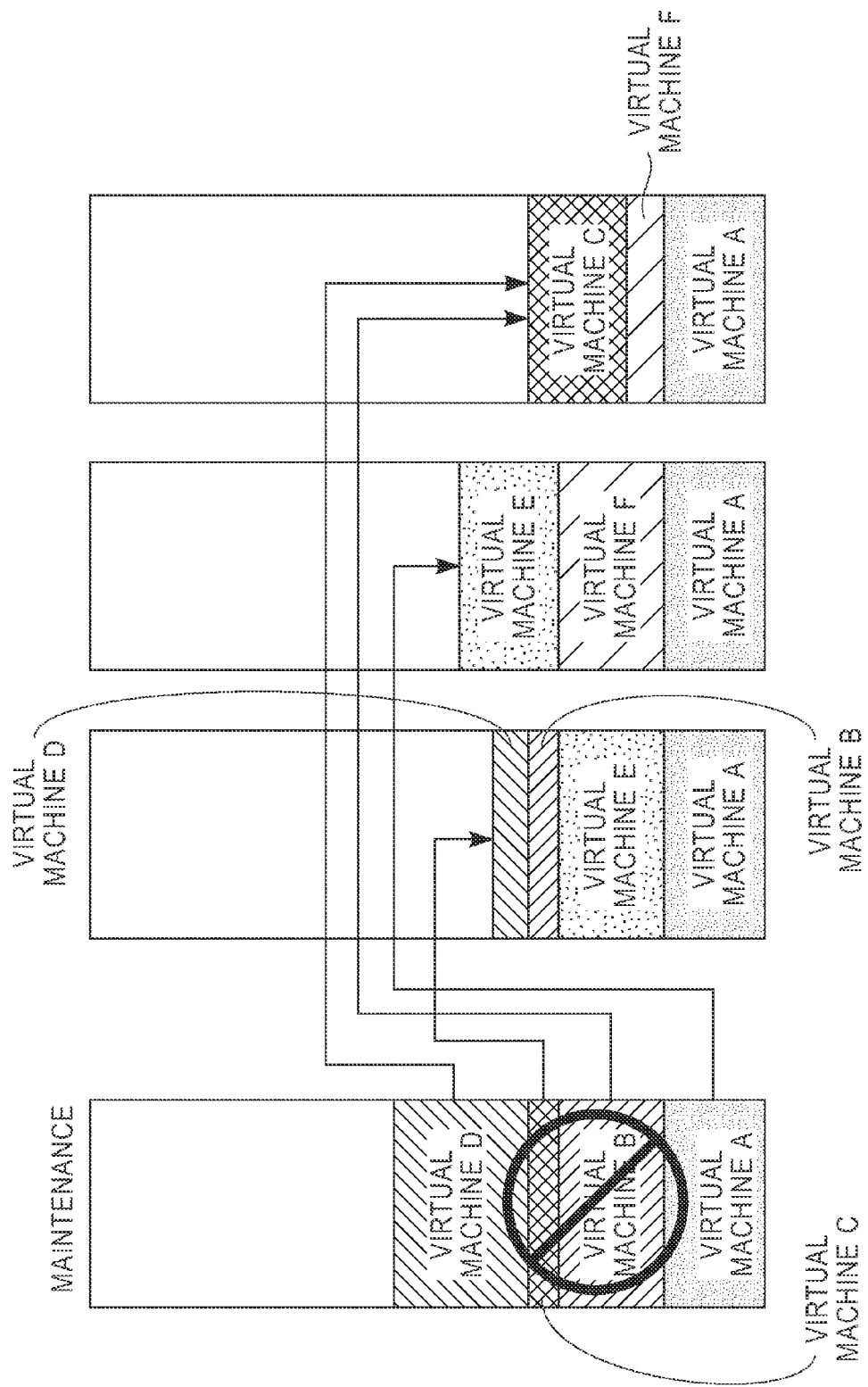
FIG. 10 is a diagram, when one physical machine is maintained, changes in the physical resource usage amount of virtual machines allocated on the remaining physical machines.

Although the first embodiment has been described as applied to the case where a physical machine stops due to a fault, in another embodiment, the present invention can be applied to a case where a physical machine stops due to maintenance. For maintenance, virtual machines on the physical machine to be maintained are saved onto predetermined saving physical machines, as shown in FIG. 10. In the embodiment corresponding to the case where a physical machine stops due to maintenance, a constraint that designates the saving physical machines can be further provided, and the constraints expressed by Exp. (8) can be appropriately corrected, as will be hereinafter described in detail.

An allocation-configuration managing unit according to a second embodiment, which is advantageous in the case where the number of physical machines is large, will be described hereinafter. Since a virtualization system according to the second embodiment has substantially the same configuration as that of the virtualization system 100 according to the first embodiment, except for the optimization problem, the optimization problem will be described hereinafter.

The optimization problem in the second embodiment is expressed as a 0-1 integer linear programming problem expressed by Exps. (9) to (17).

Formula 3

$$\text{minimize} \sum_{k=1}^{K} z_k \qquad (9)$$

$$\text{subject to: } x_{i,p} \in \{0, 1\}, \forall i \in [1, I], \forall p \in P \qquad (10)$$

$$y_{j,k} \in \{0, 1\}, \forall j \in [1, J], \forall k \in [1, K] \qquad (11)$$

$$w_{j,k,k'} \in \{0, 1\}, \forall j \in [1, J], 1 \leq k < k' \leq K \qquad (12)$$

-continued $$\sum_{p \in P} x_{i,p} = 1, \forall i \in [1, I] \tag{13}$$

$$\sum_{k=1}^{K} y_{j,k} = q_j, \forall j \in [1, J] \tag{14}$$

$$w_{j,k,k'} + 1 \geq y_{j,k} + y_{j,k'}, \forall j \in [1, J], 1 \leq k < k' \leq K \tag{15}$$

$$\sum_{i=1}^{I} \left( \sum_{p \in A_k \cup (S_k \cap A_{k'})} a_{i,t} x_{i,p} + \sum_{p \in S_k \cup (\neg A_{k'})} s_{i,t} x_{i,p} \right) + \tag{16}$$

$$\sum_{j=1}^{J} \left( \frac{c_{j,t}}{q_j} y_{j,k} + \left( \frac{c_{j,t}}{q_j - 1} - \frac{c_{j,t}}{q_j} \right) w_{j,k,k'} \right) \leq z_k,$$

$$\forall t \in [1, T], 1 \leq k < k' \leq K$$

$$\sum_{i=1}^{I} \left( \sum_{p \in A_k \cup (S_k \cap A_{k'})} a_{i,t} x_{i,p} + \sum_{p \in S_k \cap (\neg A_{k'})} s_{i,t} x_{i,p} \right) + \tag{17}$$

$$\sum_{j=1}^{J} \left( \frac{c_{j,t}}{q_j} y_{j,k} + \left( \frac{c_{j,t}}{q_j - 1} - \frac{c_{j,t}}{q_j} \right) w_{j,k',k} \right) \leq z_k,$$

$$\forall t \in [1, T], 1 \leq k' < k \leq K$$

where:

I is the number of clusters with the A-S configuration;

J is the number of clusters with the A-A configuration;

K is the number of physical machines;

T is the number of time intervals;

P is a set of virtual-machine allocation patterns with the A-S configuration;

$A_k$ is a set of virtual-machine allocation patterns with the A-S configuration in which active virtual machines are allocated on the physical machines k ($\in P$);

$S_k$ is a set of virtual-machine allocation patterns with the A-S configuration in which standby virtual machines are allocated on the physical machines k ($\subseteq P$);

$x_{i,p}=1$ is equivalent to allocation of clusters i with the A-S configuration in a virtual-machine allocation pattern p;

$y_{j,k}=1$ is equivalent to allocation of virtual machines in the clusters j with the A-A configuration on the physical machines k;

$w_{j,k,k'}$ is "1" when the virtual machines in the cluster j with the A-A configuration are allocated on the physical machines k and the other physical machines k', and is "0" or "1" in other cases;

$q_j$ is the degree of parallelism of the clusters j with the A-A configuration;

$a_{i,t}$ is the predicted peak usage amount of each active virtual machine in the A-S configuration cluster i during the time interval t;

$s_{i,t}$ is the predicted peak usage amount of each standby virtual machines in the A-S configuration cluster i during the time interval t; and $c_{j,t}$ is the total predicted peak usage amount of physical processors in the A-A configuration clusters j during the time interval t.

Decision variables in the 0-1 integer linear programming problem include $x_{i,p}$ that defines the allocation of virtual machines in the A-S configuration cluster i defined by Exps. (10) and (11) and $y_{j,k}$ that defines the allocation of virtual machines in the A-A configuration cluster j, which can take either "0" or "1". On the other hand, in the second embodiment, the allocation of virtual machines in the A-A configuration cluster j is expressed, not by the pattern that defines the allocation of all of the plurality of virtual machines, but by the decision variable $y_{j,k}$ indicating whether virtual machines are allocated on the physical machine k, and the total number of active virtual machines is limited by Exp. (14). Furthermore, in the second embodiment, a variable $w_{j,k,k'}$ defined in Exps. (12) and (15) is introduced. The variable $w_{j,k,k'}$ is "1" when virtual machines in the A-A configuration cluster j are allocated on both the physical machine k and the other physical machine k'.

The above Exps. (16) and (17) correspond to the foregoing constraint (2) and express constraints to be ensured for the physical machines k, for k<k' and k>k', for all combinations of k' and t, the total predicted peak usage amount of physical resources predicted for the physical machine k when the other physical machine k' stops during the time interval t does not exceed the physical resource amount $z_k$ prepared for the physical machine k.

Of the left sides of Exp. (16) and Exp. (17) above, the sum total $\Sigma$ for "i" in the first term is the same as that in the first embodiment. The sum total $\Sigma$ for "j" in the second term of the left sides of Exp. (16) and Exp. (17) defines substantially the same, although the form of presentation differs from that of the first embodiment. Differences from Exp. (8) is that it is formulated so as to, when the decision variable $y_{j,k}$ that defines the allocation configuration of the cluster j is given, a usage amount corresponding to an amount when virtual machines are allocated at the degree of parallelism, $q_j$, without a fault is given in the first term in the sum total $\Sigma$ for "j" in the second term, and in the second term, and to give a difference when active virtual machines are allocated also onto the other physical machine k'. The difference is the difference between a usage amount allocated with the degree of parallelism, $q_j$, −1 due to a fault and a usage amount allocated with the degree of parallelism, $q_j$, without a fault.

The optimization problem according to the second embodiment is advantageous in terms of operation performance in the case where the number of physical machines, K is large, and the degree of parallelism $q_j$ is limited to about half of the number of physical machines K. In another embodiment, adding a redundant inequality and equation to the formulas of Exps. (9) to (17) further improves the operating performance. Since these redundant inequality and equation limit a search space when searching for an integer solution to reduce the search area, an improvement in operating performance can be expected. For example, with the constraint of Exp. (15), if both the values of $y_{j,k}$ and $y_{j,k'}$ are 1, the value of $w_{j,k,k'}$ must also be 1 so that the value of $w_{j,k,k'}$ is equal to $y_{j,k}$ multiplied by $y_{j,k'}$; however, the value of $w_{j,k,k'}$ can be either 0 or 1 in other cases. However, since it is known that an optimal solution of the value of $w_{j,k,k'}$ is 0, adding redundant inequalities as follows will have the advantage of limiting the $w_{j,k,k'}$ search space.

Formula 4

$$\sum_{k=1}^{K} w_{j,k,k'} = y_{j,k'}(q_j - 1) \forall j \in [1, J], 1 \leq k' \leq K$$

$$\sum_{k'=1}^{K} w_{j,k,k'} = y_{j,k}(q_j - 1) \forall j \in [1, J], 1 \leq k \leq K$$

An allocation-configuration managing unit according to a third embodiment, which is advantageous in the case of a large-scale optimization problem, will be described hereinafter. Since a virtualization system according to the third embodiment has substantially the same configuration as that of the virtualization system 100 according to the first embodiment, except for the optimization problem and the flowchart, the flowchart and the optimization problem will be described hereinafter.

Figure 11:
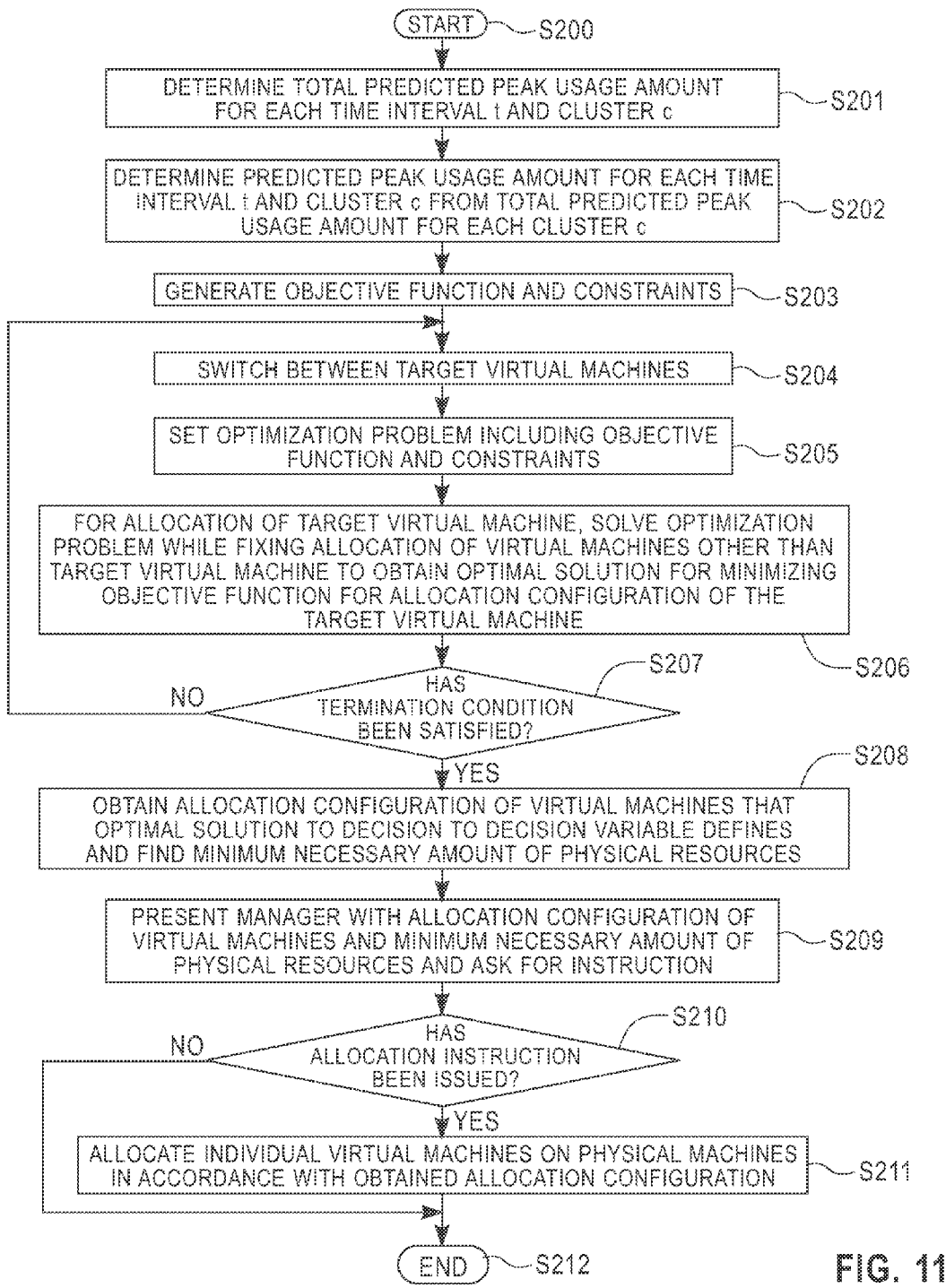
FIG. 11 is a flowchart showing the process of deriving an optimal allocation configuration that an allocation-configuration managing unit according to a second embodiment executes.

FIG. 11 is a flowchart showing the process of deriving an optimal allocation configuration that the allocation-configuration managing unit 120 according to the third embodiment executes. The process shown in FIG. 11 is started from step S200 in response to, for example, an explicit instruction from the manager via the user interface or the remote interface. In step S201, the peak-usage-amount prediction section 126 reads history information from the resource-use-history database 124 and determines a total predicted peak usage amount for each time interval t and cluster c. In step S202, an individual predicted peak usage amount for each time interval t and virtual machine is determined from the total predicted peak usage amount for each cluster c, for at least A-S configuration clusters i.

In step S203, the allocation-configuration-optimization-problem setting section 128 generates an optimization problem including an objective function and constraints and describes it in the optimization-problem data 130. The optimization problem in the third embodiment is expressed as a 0-1 integer quadratic programming problem expressed by Exps. (18) to (24).

Formula 5

$$\text{minimize}_{X,P,S}: \sum_{k=1}^{K} z_k \quad (18)$$

$$\text{subject to: } \sum_{k=1}^{K} P_{i,k} = 1, \sum_{k} S_{i,k} = 1, \forall i \in [1, I] \quad (19)$$

$$\sum_{k=1}^{K} P_{i,k} S_{i,k} = 0, \forall i \in [1, I] \quad (20)$$

$$P_{i,k}, S_{i,k} \in \{0, 1\}, \forall i \in [1, I], \forall k \in [1, K] \quad (21)$$

$$\sum_{k=1}^{K} X_{j,k} = q_j, \forall j \in [1, J] \quad (22)$$

$$X_{j,k} \in \{0, 1\}, \forall j \in [1, J], \forall k \in [1, K] \quad (23)$$

$$\sum_{i=1}^{I} P_{i,k} a_{i,t} + \sum_{i=1}^{I} S_{i,k} s_{i,t} + \sum_{i=1}^{I} P_{i,k'} S_{i,k} (a_{i,t} - s_{i,t}) + \sum_{j=1}^{J} X_{j,k} \frac{c_{j,t}}{q_j} + \sum_{j=1}^{J} X_{j,k} X_{j,k'} \left( \frac{c_{j,t}}{q_j - 1} - \frac{c_{j,t}}{q_j} \right) \leq z_k, \quad (24)$$

$$\forall t \in [1, T], \forall k, k' \in [1, K] : k \neq k'$$

where:
I is the number of clusters with the A-S configuration;
J is the number of clusters with the A-A configuration;
K is the number of physical machines;
T is the number of time intervals;
P is an allocation matrix that defines the allocation of active virtual machines with the A-S configuration;
S is an allocation matrix that defines the allocation of standby virtual machines with the A-S configuration;
X is an allocation matrix that defines the allocation of virtual machines with the A-A configuration;
$P_{i,k}=1$ is equivalent to allocation of active virtual machines in the A-S configuration cluster i on physical machine k;
$S_{i,k}=1$ is equivalent to allocation of standby virtual machines in the A-S configuration cluster i on the physical machine k;
$X_{j,k}=1$ is equivalent to allocation of active virtual machines in the A-A configuration cluster j on the physical machine k;
$q_j$ is the degree of parallelism of the A-A configuration clusters j;
$a_{i,t}$ is the individual predicted peak usage amount of each physical processor of active virtual machines in the A-S configuration cluster i during the time interval t;
$s_{i,t}$ is the individual predicted peak usage amount of each physical processor of standby virtual machines in the A-S configuration cluster i during the time interval t; and
$c_{j,t}$ is the total predicted peak usage amount of physical processors in the A-A configuration cluster j during the time interval t.

Decision variables in the 0-1 integer quadratic programming problem include $P_{i,k}$ and $S_{i,k}$ (allocation matrices P and S) that define the allocation of virtual machines in the A-S configuration cluster i defined by Exp. (21) and $X_{j,k}$ (allocation matrix X) that defines the allocation of virtual machines in the A-A configuration cluster j defined by Exp. (23), which can take either "0" or "1". Exps. (19) and (20) mean that that, for the individual A-S configuration clusters i, an active virtual machine and a standby virtual machine are each present one on either of the physical machines, and that not both an active virtual machine and a standby virtual machine are located on the same physical machine. The above Exp. (22) expresses that for the individual A-A configuration clusters j a total of $q_j$ active virtual machines are present on any of the physical machines.

The above Exp. (24) corresponds to the above constraint (2) and expresses a constraint that, for all of t, the total predicted peak usage amount of physical resources of the physical machine k when the other physical machine k' stops during the time interval t does not exceed the physical resource amount $z_k$ prepared for the physical machine k, which specifies substantially the same content, although the expression formula differs from those of the first embodiment and the second embodiment.

Preferably, the 0-1 integer quadratic programming problem expressed by the above Exp. (18) to (24) can be solved by being divided into a plurality of 0-1 integer linear programming problems, as shown in the following Exps. (25) to (29) and Exps. (30) to (34), and by applying an iterative method to one allocation matrix while fixing the other allocation matrix. The following Exps. (25) to (29) and Exps. (30) to (34) express, in the case where only the A-S configuration clusters i are included, a 0-1 integer linear programming problem for obtaining a local maximum solution for an allocation matrix S while fixing an allocation matrix P and a 0-1 integer linear programming problem for obtaining an allocation matrix Q while fixing the allocation matrix S, respectively, for the purpose of simplification. However, it will be obvious to those skilled in the art that the present invention can also be applied to the case of only the A-A configuration clusters j or the case of a combined configuration of the A-S configuration clusters i and A-A configuration clusters j.

Formula 6

$$\text{minimize}_S: \sum_{k=1}^{K} z_k \quad (25)$$

-continued $$\text{subject to: } \sum_k S_{i,k} = 1, \forall i \in [1, I] \quad (26)$$

$$\sum_k P_{i,k} S_{i,k} = 0, \forall i \in [1, I] \quad (27)$$

$$S_{i,k} \in \{0, 1\}, \forall i \in [1, I], \forall k \in [1, K] \quad (28)$$

$$\sum_{i=1}^{I} P_{i,k} a_{i,t} + \sum_{i=1}^{I} S_{i,k} s_{i,t} + \sum_{i=1}^{I} P_{i,k'} S_{i,k}(a_{i,t} - s_{i,t}) \le z_k, \quad (29)$$

$$\forall t \in [1, T], \forall k, k' \in [1, K] : k \neq k'$$

Formula 7

$$\text{minimize } p: \sum_{k=1}^{K} z_k \quad (30)$$

$$\text{subject to: } \sum_k P_{i,k} = 1, \forall i \in [1, I] \quad (31)$$

$$\sum_k P_{i,k} S_{i,k} = 0, \forall i \in [1, I] \quad (32)$$

$$P_{i,k} \in \{0, 1\}, \forall i \in [1, I], \forall k \in [1, K] \quad (33)$$

$$\sum_{i=1}^{I} P_{i,k} a_{i,t} + \sum_{i=1}^{I} S_{i,k} s_{i,t} + \sum_{i=1}^{I} P_{i,k'} S_{i,k}(a_{i,t} - s_{i,t}) \le z_k, \quad (34)$$

$$\forall t \in [1, T], \forall k, k' \in [1, K] : k \neq k'$$

In step S204, the allocation-configuration-optimization-problem setting section 128 sets a target virtual machine for which a local optimal solution is obtained while switching from one to another, and in step S205, sets an optimization problem including a corresponding constraint of the generated optimization problems into a mathematical programming solver. Here, the target virtual machine is, for example, in the 0-1 integer linear programming problem expressed by Exps. (25) to (29), a standby virtual machine corresponding to the allocation matrix S, and in 0-1 integer linear programming problem expressed by Exps. (30) to (34), the target virtual machine is an active virtual machine corresponding to the allocation matrix P. In the case of only the A-S configuration, in step S204, the allocation-configuration-optimization-problem setting section 128 switches between an active virtual machine and a standby virtual machine as a virtual machine, and in step S205, sets an optimization problem to a mathematical programming solver. In the case of only the A-A configuration, in step S204, the allocation-configuration-optimization-problem setting section 128 selects a target virtual machine from each of the clusters, and in step S205, sets an optimization problem to a mathematical programming solver.

In step S206, an instruction to execute a calculation is given to the mathematical programming solver to which the optimization problem is set, and the allocation-configuration deriving section 132 solves, for the allocation of a target virtual machine, a corresponding 0-1 integer linear programming problem while fixing the allocation matrix of virtual machines other than the target virtual machine to obtain a local optimal solution for minimizing the objective function of the allocation matrix of the target virtual machine. In step S207, the allocation-configuration managing unit 120 determines whether a termination condition has held. Here, the termination condition is, for example, a converging condition for determining whether a required local optimal solution has converged and a truncation condition for truncating the operation according to a predetermined number of times of iteration or time. In step S207, if it is determined that the termination condition has not held (NO), the process is looped back to step S204, and the virtual machine is switched to the next target virtual machine, and the derivation of a local optimal solution is repeated until the termination condition is satisfied.

On the other hand, if it is determined in step S207 that the termination condition is satisfied (YES), the process proceeds to step S208. Since the optimization problem in the third embodiment is expressed as a 0-1 integer linear programming problem expressed by Exps. (25) to (29) or Exps. (30) to (34), a mathematical programming solver that implements a branch and bound algorithm or a branch and cut algorithm can be used. In step S208, the allocation-configuration deriving section 132 obtains the allocation configuration of virtual machines defined by the allocation matrixes P, S, and X, which are decision variables, obtains the value of a minimized objective function when the termination condition is satisfied as a minimum necessary physical resource amount, and writes the value as the operation result 134. Since the allocation matrixes P and S show the allocation pattern of virtual machines, the 0-1 integer linear programming problem can offer the allocation pattern or a specific allocation configuration for mapping the virtual machines on physical machines.

Since the processes from step S209 to step S212 are the same as those of step S107 to step S110 in the first embodiment, shown in FIG. 7, descriptions thereof will be omitted. Although the description of the A-A configuration clusters j is omitted, the allocation can be achieved, as in the case of the A-S configuration clusters i in which the optimization problem is solved by applying the iterative method while fixing the variables P and S, by fixing q−1 virtual machines and then finding the local optimal solution of the remaining virtual machine, and iterating the process of the remaining other q−1 virtual machines.

Preferably, the optimization problem according to the third embodiment can be approximately solved. In the third embodiment, since the local optimal solution of the allocation matrix of one virtual machine is found while fixing the allocation matrix of other virtual machine, the number of decision variables to be handled at one time can be reduced. Thus, it can be said that the third embodiment is advantageous in handling a large scale problem as compared with the first and second embodiments.

An allocation-configuration managing unit according to a fourth embodiment capable of complicated setting including condition setting for higher-level clusters and designation of a saving machine during maintenance will be described hereinafter. Since a virtualization system according to the fourth embodiment has substantially the same configuration as that of the virtualization system 100 according to the first embodiment, except for the optimization problem, the optimization problem will be described hereinafter.

The optimization problem according to the fourth embodiment is written as a 0-1 integer programming problem expressed by Exps. (35) to (50) shown in FIG. 12. The optimization problem expressed by Exps. (35) to (50) shown in FIG. 12 derives an optimal physical-machine allocation configuration for minimizing the sum total of the entire physical processors of all of a plurality of physical machines, in an environment in which a micropartitioning function is available and in which physical processors are shared by virtual machines, and memories are fixedly allocated to the physical machines, under a constraint that the sum total of the predicted peak usage amounts of physical processors of virtual machines allocated on the physical machines does not exceed the number of physical processors mounted on the physical machines during all of a normal operation, a fault of the physical machines, and maintenance.

In Exps. (35) to (50) shown in FIG. 12:

B is a set of operating systems (higher-level systems);

$C_{AS}(b)$ is a set of A-S configuration clusters in an operating system b∈B;

$C_{AA}(b)$ is a set of A-A configuration clusters in the operating system b∈B;

K is a set of physical machines;

T is a set of time intervals;

$q_{b,c}$ is the number of virtual machines in an A-A configuration cluster c∈$C_{AA}(b)$ of the operating system b∈B;

$a_{b,c,t}$ is the individual predicted peak usage amount of the physical processors of the active virtual machines in the A-S configuration cluster c∈$C_{AS}(b)$ of the operating system b∈B during the time interval t;

$s_{b,c,t}$ is the individual predicted peak usage amount of physical processors of the standby virtual machines in the A-S configuration cluster c∈$C_{AS}(b)$ of the operating system b∈B during the time interval t;

$p_{b,c,t}$ is the total predicted peak usage amount of physical processors in the A-A configuration cluster c∈$C_{AS}(b)$ of the operating system b∈B during the time interval t; and U is the maximum number of physical processors that can be mounted on the individual physical machines.

Exp. (35) shown in FIG. 12 expresses an objective function to be minimized, and Exps. (36) to (40) shown in FIG. 12 define variables in the integer programming problem. More specifically, Exp. (36) expresses that, a variable $x_{b,c,i,k,l}=1$ is equivalent to that an active or standby virtual machine in the A-S configuration cluster c of an operating system b is allocated on the physical machine k and is saved on a physical machine l during maintenance. Exp. (37) expresses that, a variable $y_{b,c,k,l}=1$ is equivalent to that a virtual machine in the A-A configuration cluster c of the operating system b is allocated on the physical machine k and is saved on the physical machine l during maintenance. In other words, Exps. (36) and (37) express the range of a variable that defines a saving physical machine l on which a virtual machine that is present on the physical machine k is saved during maintenance. Exp. (38) expresses that $v_{b,c,k,k'}=1$ holds if an active virtual machine in the A-S configuration cluster c of the operating system b is allocated on the physical machine k, and if a standby virtual machine is allocated on the physical machine k'. Exp. (39) expresses that $w_{b,c,k,k'}=1$ holds if two of the virtual machines in the A-A configuration cluster c of the operating system b are allocated on the physical machines k and k'. Exp. (40) expresses the number of physical processors prepared on the physical machines k.

Exps. (41) to (43) shown in FIG. 12 express fundamental constraints for A-S clusters in the integer programming problem. Exp. (41) expresses a constraint that an active virtual machine and a standby virtual machine in the A-S configuration cluster c of the operating system b are not allocated on the same physical machine k. On the other hand, Exp. (42) expresses that the individual virtual machines in the A-S configuration cluster c of the operating system b are allocated any one of the physical machines, and a saving physical machine is uniquely determined. Exp. (43) expresses that $v_{b,c,k,k'}=1$ holds if an active virtual machine in the A-S configuration cluster c of the operating system b is allocated on the physical machine k, and a standby virtual machine is allocated on the physical machine k'.

Exps. (44) to (46) shown in FIG. 12 express fundamental constraints for A-A clusters in the integer programming problem. Exp. (44) expresses that the saving physical machines of the individual virtual machines in the A-A configuration cluster c of the operating system b are uniquely determined, and Exp. (45) expresses that virtual machines in the A-A configuration cluster c of the operating system b are allocated on $q_{b,c}$ physical machines. Exp. (46) expresses that $w_{b,c,k,k'}=1$ holds if virtual machines in the A-A configuration cluster c of the operating system b are allocated on the physical machines k and k'.

Exp. (47) shown in FIG. 12 expresses an additional constraint for balancing the number of active virtual machines that belong to the same operating system allocated on the same physical machine. Exp. (47) expresses a constraint that the number of active virtual machines of the operating system b allocated on the physical machine k is set to substantially a value obtained by dividing the number of total active virtual machines of the operating system b by the number of physical machines, K. Thus, even if the number of physical machines, K, is smaller than the number of virtual machines, the active virtual machines can be distributed as much as possible. In another embodiment, a constraint that active virtual machines that belong to the same operating system are not allocated on the same physical machine can be added.

Exps. (48) and (49) shown in FIG. 12 express constraints at a fault of a physical machine. Exp. (48) expresses a constraint that the sum total of the predicted peak usage amount of the physical processors in the physical machine k when the physical machine k' (>k) has a fault during the time interval t does not exceed the physical resource amount $z_k$ prepared for the physical machine k. Likewise, Exp. (49) expresses the case of physical machines k' (<k). Exp. (50) shown in FIG. 12 expresses a constraint during the maintenance of the physical machine. In this case, if a physical machine accommodating an active virtual machine in the A-S configuration cluster has a fault, the standby virtual machine is activated to maintain the performance of the active virtual machine. Furthermore, if a physical machine accommodating an active virtual machine in the A-A configuration cluster has a fault, the remaining active virtual machines uniformly maintain the performance.

Exp. (50) expresses a constraint that, when maintaining the physical machine k' during the time interval t, the sum total of the predicted peak usage amounts of the physical processors of the physical machine k does not exceed the physical resource amount $z_k$ prepared for the physical machine k. During maintenance, all virtual machines operating on a physical machine to be maintained are moved to the other physical machines at some point, and at that time, the amount of physical resources, such as a physical processor and a physical memory, is maintained.

Under a virtualization environment of a logical partitioning system, virtual I/O servers (VIOSs) sometimes operate on the individual physical machines for the input/output of a network resource and s storage resource. For the VIOS virtual machines, one or a plurality of (for example, two) virtual machines can be allocated on physical machines, and also CPUs can be fixedly allocated, and thus the allocation can be calculated without considering the optimization problem. This is because there is no need to consider the maintenance of the performance of VIOSs at a fault because VIOSs are virtual machines that provide a virtual inputting/outputting function to virtual machines in the same physical machine. Also during maintenance, there is no need to save a virtual machine fixed to a physical machine, such as VIOSs.

The allocation-configuration managing unit 120 according to the fourth embodiment described above allows more complicated setting including condition setting for higher-level clusters and designation of a saving physical machine during maintenance. For the optimization problem, constraints beyond the relationship in clusters, for example, balancing the number of active virtual machines that belong to the same higher-level cluster. Also when moving a virtual machine on a physical machine to be maintained, in addition to at a fault, onto another physical machine, a necessary and sufficient physical resource amount can be ensured.

EXPERIMENT

1. Implementation in Computer

A computer system that implements the program of the allocation-configuration managing unit 120 according to the fourth embodiment of the present invention was implemented using a multicore processor (Intel (registered trademark) Core (registered trademark) 2Duo P8400) with a clock number of 2.26 GHz and a ThinkPad (registered trademark) X200 equipped with a 2.94-GB RAM. The operating system of this computer system was WINDOWS (registered trademark) XP. The program was described in Python and uses IBM (registered trademark) ILOG (registered trademark) CPLEX (registered trademark) as a mathematical programming solver.

2. Use-History Information and Data Set

Figure 13A:
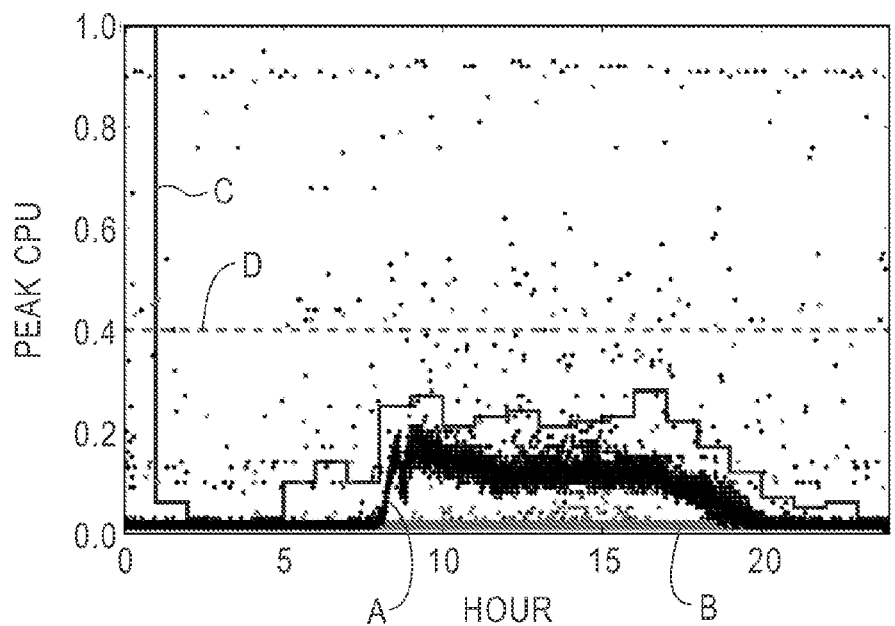
FIG. 13 shows diagrams showing the experimental results of optimization problems.

Time series data of actual measurements, as indicated by the dots in FIG. 13(A), was used as use-history information. The actual measurements shown in FIG. 13(A) are data of some logical partitions (LPARs) sampled at intervals of one minute over 24 hours, of which black (series A) represents the actual measurements of an active LPAR, and dark gray (series B) represents the actual measurements of a standby LPAR. The broken line (series D) represents the number of CPUs that the person in charge estimates to be necessary when manually determining the allocation of the virtual machines; however, this value is not needed in the following experiment.

3. Experimental Example

Experimental Example 1

Predicted peak usage amounts in units of the number of CPUs every hour, as indicated by the light gray line (series C), were obtained from the time series data on actual measurement as indicated by the dots in FIG. 13(A) to form a data set for generating an optimization problem. According to FIG. 13(A), the operating system for the target active LPAR showed a time characteristic that it is under high load from 0 a.m. to 1 or 2 a.m., which is a midnight time zone, and under load from 8 to 20 o'clock in an operating time zone.

In the implementation and data set, when a 0-1 integer linear programming problem for allocating 20 LPARs in four casings (physical machines) was solved by a mathematical programming solver, a strict solution was obtained in 1.3 seconds. A finally obtained allocation configuration was manually validated. In Experimental Example 1, 24 processors were determined as a minimum necessary physical resource amount in the optimal solution, as compared with a past example in which a total of 33 CPUs were necessary when manually using a spreadsheet.

Experimental Example 2

Figure 13B:
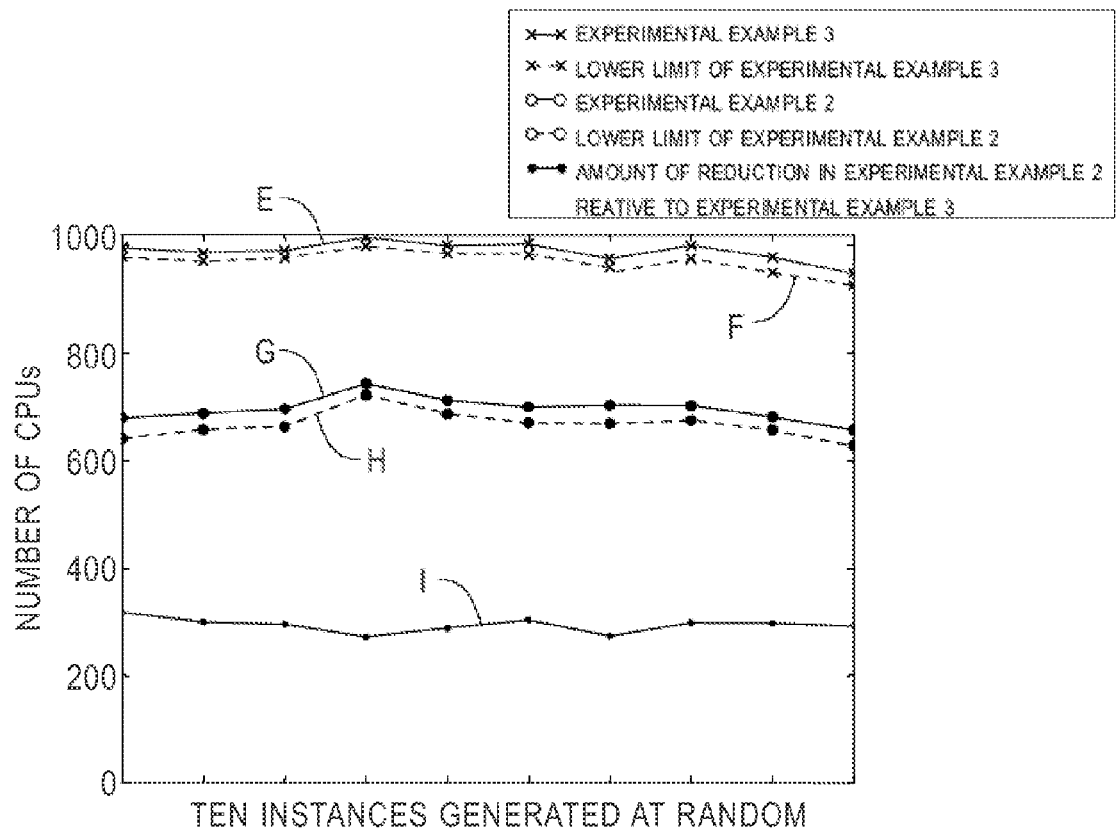

24 hours were divided into four, and predicted peak usage amounts in units of the number of CPUs every six hours were generated at random to form a data set for generating an optimization problem. In the implementation, when a 0-1 integer linear programming problem for allocating 100 LPARs including 50 A-S configuration clusters and 50 A-A configuration clusters in nine casings was solved by a mathematical programming solver, an approximate solution within an average of 4% from an optimal solution was obtained in 30 seconds. FIG. 13(B) shows the approximate solutions and the lower limits of the individual instances, generated at random, of the optimization problem as the result of Experimental Example 2.

Experimental Example 3

For comparison, predicted peak usage amounts averaged over 24 hours were generated at random without dividing the time interval to form a data set for generating an optimization problem. In the implementation, a 0-1 integer linear programming problem for allocating 100 LPARs including 50 A-S configuration clusters and 50 A-A configuration clusters in nine casings (physical machines) was solved by a mathematical programming solver to obtain an approximate solution. FIG. 13(B) shows the approximate solutions and the lower limits of the individual instances, generated at random, of the optimization problem as the result of Experimental Example 3.

4. Consideration

The result of the above Experimental Example 1 shows that the allocation configuration optimization process according to the present invention can reduce the number of CPUs by 27% as compared with using manual calculation and can give a guarantee in terms of value-at-risk. In other words, this can further improve the resource use efficiency by reducing the number of CPUs in dependence on the obtained allocation configuration. Furthermore, the obtained allocation configuration was also validated, and thus, it was confirmed that the result is sufficiently reliable.

FIG. 13(B) plots the individual instances, generated at random, of the optimization problem in abscissa and the number of CPUs obtained in ordinate. In FIG. 13(B), series E expresses the approximate solution of Experimental Example 3 in which no dividing is performed for comparison, and series F expresses the lower limit of Experimental Example 3. In FIG. 13(B), series G represents the approximate solution of Experimental Example 2, series H represents the lower limit of Experimental Example 2, and series I represents the amount of reduction of Experimental Example 2 relative to Experimental Example 3. Experimental Example 2 is an example of the present invention, in which, as shown in FIG. 13(B), 24 hours were divided into four time intervals to solve the optimal solution, thereby obtaining an optimal solution to the allocation configuration, thus allowing the number of CPUs to be reduced by about 30% as compared with Experimental Example 3 in which 24 hours are not divided.

As described above, the embodiments of the present invention can provide an information processing apparatus, an information processing system, and a method for determining an allocation configuration capable of deriving the allocation configuration of virtual machines that ensures a necessary and sufficient amount of physical resources for continuously providing services in consideration of the load characteristics of a plurality of server functions, even if part of the physical machines stop due to a fault or maintenance, by sharing the load among the remaining physical machines, and that minimizes the amount of physical resources, as well as a program and a recording medium for the same.

In the foregoing embodiments, although a virtualization system for building a server consolidation environment for consolidating operating systems has been described, the present invention is not limited thereto; it is needless to say that the present invention can be used as the base of private or public cloud computing.

The allocation-configuration managing unit according to the embodiments of the present invention is provided by loading a computer-executable program on a computer and implementing various functional parts. Examples of the program include computer-executable programs described in legacy programming languages, such as FORTRAN, COBOL, PL/I, C, C++, Java (registered trademark), Java (registered trademark) Beans, Java (registered trademark) Applet, Java (registered trademark) Script, Perl, Ruby, and Python, modeling languages, such as OPL and AMPL, and object-oriented programming languages and can be distributed as a computer-readable recording medium.

Although the present invention has been described with reference to the illustrated embodiments and examples, it is to be understood that the present invention is not limited to the illustrated embodiments, and modifications can be made within the scope that those skilled in the art can consider, for example, other embodiments, addition, changes, and deletion, and any forms are included in the scope of the present invention provided that they offer the operational advantages of the present invention.

The invention claimed is:

1. An information processing apparatus configured to determine an allocation configuration for allocating virtual machines to physical machines, the apparatus comprising:
    a prediction section configured to determine a total predicted peak usage amount of physical resources based on the sum of predicted peak usage amounts for each time interval of a plurality of time intervals for individual clusters of a plurality of clusters wherein the clusters include a plurality of virtual machines;
    a setting section configured to set a constraint that ensures that, for individual combinations of a first physical machine, a second physical machine, and a time interval t, a total predicted peak usage amount of the physical resource predicted for the first physical machine if the second physical machine stops during the time interval t does not exceed a physical resource amount prepared for the first physical machine
        wherein for the first physical machine k, the second physical machine k', and the time interval t, for which the total predicted peak usage amount is predicted,
        the setting section formulates the total predicted peak usage amount $\phi_{k,k',t}$ as a sum total of the predicted peak usage amount $\gamma_{c,t}$ of clusters c, predicted for the first physical machine k if the second physical machine k' stops, the peak usage amount $\gamma_{c,t}$ being given in correspondence with a decision variable that defines the allocation configuration of the clusters c, and the predicted peak usage is determined for each resource and time interval; and
    an allocation-configuration deriving section configured to derive an allocation configuration by calculating, in accordance with the constraint, a solution to an optimization.

2. The information processing apparatus according to claim 1, wherein the allocation-configuration deriving section calculates an optimal solution to a decision variable of the optimization problem by iterating a process of searching for the optimal solution to the decision variable that defines the allocation configuration of a target virtual machine in each cluster c by switching between target virtual machines while fixing the decision variable that defines the allocation configuration of the virtual machine other than the target virtual machine.

3. The information processing apparatus according to claim 1, wherein
    one or more clusters constitute a higher-level cluster; and
    the setting section further sets an additional constraint for balancing the number of active virtual machines that belong to the same higher-level cluster and that are allocated on the same physical machine.

4. The information processing apparatus according to claim 1, wherein the setting section further sets an additional constraint that defines the physical machine serving as a saving machine in which the virtual machine present on the physical machine during maintenance of the physical machine.

5. The information processing apparatus according to claim 1, further comprising an allocation processing section configured to allocate virtual machines on the physical machine determined in accordance with the derived allocation configuration.

6. The information processing apparatus according to claim 1, wherein the allocation-configuration deriving section outputs a minimum value of the objective function as a necessary and sufficient physical resource amount.

7. The information processing apparatus according to claim 1, wherein the setting section further sets an additional constraint that the virtual machines belonging to the same cluster are not allocated on the same physical machine.

8. The information processing apparatus according to claim 1, wherein,
    for a cluster i of the clusters c, including an active virtual machine and a standby virtual machine, the setting section formulates the total predicted peak usage amount $\phi_{k,k',t}$ wherein,
    (i) if the active virtual machine is present on the first physical machine k or if the standby virtual machine is present on the first physical machine k and the active virtual machine is present on the second physical machine k', the setting section sets a predicted peak usage amount $\alpha_{i,t}$ predicted for the active virtual machine as the predicted peak usage amount $\gamma_{c,t}$; and
    (ii) if the standby virtual machine is present on the first physical machine k and the active virtual machine is not present on the second physical machine k', the setting section sets a predicted peak usage amount $\sigma_{i,t}$ predicted for the standby virtual machine as the predicted peak usage amount $\gamma_{c,t}$.

9. The information processing apparatus according to claim 1, wherein
    for a cluster j of the clusters c, including an active virtual machine with the degree of parallelism, $\rho_j$, the setting section formulates the total predicted peak usage amount $\phi_{k,k',t}$ wherein,
    (i) if an active virtual machine is present on the first physical machine k and an active virtual machine is not present on the second physical machine k', the setting section sets a usage amount corresponding to an amount obtained by dividing a total predicted peak usage amount $\pi_{j,t}$ predicted for the entire cluster j by the degree of parallelism, $\rho_j$, as the predicted peak usage amount $\gamma_{c,t}$; and
    (ii) if the active virtual machines are present on both of the first physical machine k and the second physical machine k', the setting section sets a usage amount corresponding to an amount obtained by dividing the total predicted peak usage amount $\pi_{j,t}$ by the degree of parallelism, $\rho_j$, if the second physical machine k' stops as the predicted peak usage amount $\gamma_{c,t}$.

10. An information processing system having a plurality of physical machines that each provide a virtual-machine operating environment and an information processing apparatus that allocates virtual machines to the plurality of physical machines, the information processing apparatus comprising:

a prediction section configured to determine a total predicted peak usage amount of physical resources based on the sum of predicted peak usage amounts for each time interval of a plurality of time intervals for individual clusters of a plurality of clusters wherein the clusters include a plurality of virtual machines;

a setting section configured to set a constraint that ensures that, for individual combinations of a first physical machine, a second physical machine, and a time interval t, the total predicted peak usage amount of the physical resource predicted for the first physical machine if the second physical machine stops during the time interval t does not exceed a physical resource amount prepared for the first physical machine, wherein for the first physical machine k, the second physical machine k', and the time interval t, for which the total predicted peak usage amount is predicted, the setting section formulates the total predicted peak usage amount $\phi_{k,k',t}$ as a sum total of the predicted peak usage amount $\gamma_{c,t}$ of clusters c, predicted for the first physical machine k if the second physical machine k' stops, the predicted peak usage amount $\gamma_{c,t}$ being given in correspondence with a decision variable that defines the allocation configuration of the clusters c, and the predicted peak usage is determined for each resource and time interval;

an allocation-configuration deriving section configured to derive an allocation configuration by calculating, in accordance with the constraint, a solution to an optimization problem for minimizing, as an objective function, the sum total of the physical resource amounts of the plurality of physical machines to which the virtual machines are allocated; and an allocation processing section configured to allocate the virtual machines on the physical machine, of the plurality of physical machines, determined according to the allocation configuration.

\* \* \* \* \*